(12) United States Patent
Zarras

(10) Patent No.: US 9,026,897 B2
(45) Date of Patent: May 5, 2015

(54) INTEGRATED, CONFIGURABLE, SENSITIVITY, ANALYTICAL, TEMPORAL, VISUAL ELECTRONIC PLAN SYSTEM

(71) Applicant: Logic9s, LLC, New York, NY (US)

(72) Inventor: Dean Zarras, Bedford, NY (US)

(73) Assignee: Logic9s, LLC, New York, NY (US)

( * ) Notice: Subject to any disclaimer, the term of this patent is extended or adjusted under 35 U.S.C. 154(b) by 0 days.

(21) Appl. No.: 14/327,310

(22) Filed: Jul. 9, 2014

(65) Prior Publication Data

US 2015/0019946 A1 Jan. 15, 2015

Related U.S. Application Data

(60) Provisional application No. 61/845,536, filed on Jul. 12, 2013.

(51) Int. Cl.
G06F 17/18 (2006.01)
G06F 17/24 (2006.01)

(52) U.S. Cl.
CPC ................... *G06F 17/246* (2013.01)

(58) Field of Classification Search
CPC ................................................. G06F 17/246
USPC ......................................................... 715/219
See application file for complete search history.

(56) References Cited

U.S. PATENT DOCUMENTS 6,057,837 A * 5/2000 Hatakeda et al. ............. 715/765
6,185,582 B1 * 2/2001 Zellweger et al. ............ 715/212

(Continued)

FOREIGN PATENT DOCUMENTS

CA 2534804 10/2013
WO WO 2011/136932 A1 11/2011

OTHER PUBLICATIONS

Woodring, Jonathan, and Han-Wei Shen. "Multiscale time activity data exploration via temporal clustering visualization spreadsheet." Visualization and Computer Graphics, IEEE Transactions on 15, No. 1 (2009): 123-137.*

(Continued)

*Primary Examiner* — Frank D Mills
(74) *Attorney, Agent, or Firm* — Iandiorio Teska & Coleman, LLP

(57) ABSTRACT

An integrated, configurable, sensitivity, analytical, temporal, visual system for an electronic plan system including stored in a memory and configured to be executed by one or more processors. The programs include instructions to generate: an electronic plan including one or more row descriptors each including a plurality of row descriptor properties, one or more column descriptors each including a plurality of column descriptor properties, one or more cells mapped to one of the row descriptors by a unique row descriptor identifier and to one of the of one of the column descriptors by a unique column descriptor identifier, and each of the one or more cells including a numeric formula or a user-defined formula that references one or more other cells. An interpreter is configured to read each formula of the one or more cells and determine dependency data associated with each cell. A calculation engine responsive to the interpreter is configured to determine a numeric value of each of the one or more cells, and a sensitivity analyzer responsive to a configurable user-initiated change to a value of a start cell is configured to activate the calculation engine to calculate the value of dependent cells affected by said change and visually highlight the dependent cells affected by the change in a predetermined sensitivity format.

26 Claims, 33 Drawing Sheets

(56) References Cited

U.S. PATENT DOCUMENTS

| | | | |
|---|---|---|---|
| 6,256,649 | B1 | 7/2001 | Mackinlay et al. |
| 6,438,565 | B1* | 8/2002 | Ammirato et al. ............ 715/204 |
| 7,206,997 | B2 | 4/2007 | Alden et al. |
| 7,415,481 | B2 | 8/2008 | Becker et al. |
| 7,533,340 | B2* | 5/2009 | Hudson et al. ................ 715/711 |
| 7,647,551 | B2* | 1/2010 | Vigesaa et al. ................ 715/217 |
| 7,693,860 | B2 | 4/2010 | Babanov et al. |
| RE41,500 | E | 8/2010 | Shelton et al. |
| 7,797,621 | B1* | 9/2010 | Danner et al. ................ 715/220 |
| 7,805,433 | B2* | 9/2010 | Dickerman et al. .......... 707/713 |
| 7,849,396 | B2 | 12/2010 | Belmonte et al. |
| 7,949,937 | B2 | 5/2011 | Wu |
| 8,032,822 | B1 | 10/2011 | Artamonov et al. |
| 8,046,673 | B2 | 10/2011 | Polo-Malouvier et al. |
| 8,127,223 | B2 | 2/2012 | Becerra, Sr. et al. |
| 8,239,751 | B1 | 8/2012 | Rochelle et al. |
| 8,321,780 | B2 | 11/2012 | Erwig et al. |
| 8,479,093 | B2 | 7/2013 | Ravindran et al. |
| 8,484,549 | B2 | 7/2013 | Burr et al. |
| 8,549,392 | B2 | 10/2013 | Simkhay et al. |
| 8,782,508 | B2* | 7/2014 | Bauchot ........................ 715/212 |
| 2002/0023105 | A1* | 2/2002 | Wisniewski .................. 707/503 |
| 2002/0078086 | A1 | 6/2002 | Alden et al. |
| 2003/0188258 | A1* | 10/2003 | Aureglia et al. .............. 715/503 |
| 2004/0225692 | A1* | 11/2004 | Pasumansky et al. ........ 707/200 |
| 2005/0251748 | A1 | 11/2005 | Gusmorino et al. |
| 2006/0080594 | A1* | 4/2006 | Chavoustie et al. .......... 715/503 |
| 2006/0080595 | A1 | 4/2006 | Chavoustie et al. |
| 2007/0028159 | A1* | 2/2007 | Ying et al. .................... 715/503 |
| 2007/0055556 | A1 | 3/2007 | Frank-Backman et al. |
| 2007/0061698 | A1* | 3/2007 | Megiddo et al. .............. 715/503 |
| 2007/0101252 | A1* | 5/2007 | Chamberlain et al. ........ 715/503 |
| 2007/0244672 | A1* | 10/2007 | Kjaer ............................... 703/2 |
| 2007/0250295 | A1* | 10/2007 | Murray et al. .................... 703/2 |
| 2007/0282462 | A1* | 12/2007 | Sourov et al. .................. 700/17 |
| 2008/0046804 | A1 | 2/2008 | Rui et al. |
| 2008/0148140 | A1* | 6/2008 | Nakano ......................... 715/215 |
| 2008/0168341 | A1 | 7/2008 | Payette |
| 2010/0205521 | A1 | 8/2010 | Folting |
| 2010/0251090 | A1 | 9/2010 | Chamberlain et al. |
| 2010/0251091 | A1* | 9/2010 | Jania ............................. 715/219 |
| 2010/0306639 | A1* | 12/2010 | Burr et al. ..................... 715/227 |
| 2010/0325526 | A1 | 12/2010 | Ellis et al. |
| 2011/0072340 | A1* | 3/2011 | Miller et al. .................. 715/220 |
| 2012/0324328 | A1 | 12/2012 | Chamberlain et al. |
| 2013/0007607 | A1 | 1/2013 | Caldwell et al. |
| 2013/0013994 | A1 | 1/2013 | Handsaker et al. |
| 2013/0061123 | A1 | 3/2013 | Rochelle et al. |
| 2013/0086459 | A1 | 4/2013 | Folting et al. |
| 2013/0086460 | A1 | 4/2013 | Folting et al. |
| 2013/0103615 | A1 | 4/2013 | Mun |
| 2014/0047312 | A1* | 2/2014 | Ruble et al. ................... 715/212 |
| 2014/0129912 | A1* | 5/2014 | Kannala et al. ............... 715/215 |
| 2014/0380139 | A1* | 12/2014 | Mondri et al. ................ 715/212 |
| 2015/0026075 | A1* | 1/2015 | Mondri et al. ................ 705/304 |

OTHER PUBLICATIONS

Markham et al., "Scenario Analysis in Spreadsheets with Excel's Scenario Tool", Informs Transactions on Education 6(2):23-31, 2006, http://dx.doi.org/10.1287/ited.6.2.23, http://dx.doi.org/10.1287/ited.6.2.23, Cover sheet and 9 pages (10 pages total).

"Sensitivity Analysis in Spreadsheets", Sumwise.com, Dec. 16, 2010, http://www.sumwise.com/blog/sensitivity-analysis-spreadsheets/, 5 pages total.

International Searching Authority, Written Opinion for International Application No. PCT/US2014/053249, Date Mailed Dec. 18, 2014, 9 pgs.

International Searching Authority, Written Opinion for International Application No. PCT/US2014/053330, Date Mailed Dec. 5, 2014, 6 pgs.

\* cited by examiner

Longer Investment Sim: Main -- Timepoint report for May 2013 —— 313                    340

| Plan Attribute | Formula | Value |
|---|---|---|
| ▼ ⌑ Roots —— 342 | | |
| Percent Stocks | | 40.00 |
| Percent Bonds | | 40.00 |
| Percent Gold | | 20.00 |
| ROR Stocks | | 7.00 |
| ROR Bonds | | 3.00 |
| ROR Gold | | 5.00 |
| ▼ ⌑ Dependents —— 344 | —— 345 | |
| Starting Balance | Ending Balance from prior period | 214,408.53 |
| Earnings from Stocks | Starting Balance * (Percent Stocks / 100.0) * (ROR Stocks / 100.0) | 6,003.44 |
| Earnings from Bonds | Starting Balance * (Percent Bonds / 100.0) * (ROR Bonds / 100.0) | 2,572.90 |
| Earnings from Gold | Starting Balance * (Percent Gold / 100.0) * (ROR Gold / 100.0) | 2,144.09 |
| Total Earnings | Earnings from Stocks + Earnings from Bonds + Earnings from Gold | 10,720.43 |
| Ending Balance | Starting Balance + Total Earnings | 255,128.96 |
| Periodic ROR | (Total Earnings / Starting Balance) * 100.0 | 5.00 |

ClearFactr Plan Report for Longer Investment Sim

☐ Statistics ☐ Highlighting

| | Attribute | Time Period | Description |
|---|---|---|---|
| ☐ | Starting Balance | Jan 2013 | 185,000 |
| ☐ | | Feb 2013 -- Sep 2015 | Ending Balance from prior period |
| ☐ | | Oct 2013 -- Jan 2016 | 0 |
| ☐ | Percent Stocks | Entire plan | 0 -- 40 avg: 37.84 distinct 2 |
| ☐ | Percent Bonds | Entire plan | 0 -- 40 avg: 35.68 distinct 2 |
| ☐ | Percent Gold | Entire plan | 0 -- 20 avg: 17.84 distinct 2 |
| ☐ | ROR Stocks | Entire plan | -15 -- 100 avg: 9.41 distinct 6 |
| ☐ | ROR Bonds | Entire plan | -15 -- 22 avg: 2.41 distinct 5 |
| ☐ | ROR Gold | Entire plan | 0 -- 6 avg: 4.49 distinct 3 |
| ☐ | Earnings from Stocks | Jan 2013 -- Sep 2015 | Starting Balance * (Percent Stocks / 100.0) * (ROR Stocks / 100.0) |
| ☐ | | Oct 2015 -- Jan 2016 | 0 |
| ☐ | Earnings from Bonds | Jan 2013 -- Sep 2015 | Starting Balance * (Percent Bonds / 100.0) * (ROR Bonds / 100.0) |
| ☐ | | Oct 2015 -- Jan 2016 | 0 |
| ☐ | Earnings from Gold | Jan 2013 -- Sep 2015 | Starting Balance * (Percent Gold / 100.0) * (ROR Gold / 100.0) |
| ☐ | | Oct 2015 -- Jan 2016 | 0 |
| ☐ | Total Earnings | Jan 2013 -- Sep 2015 | Earnings from Stocks + Earnings from Bonds + Earnings from Gold |
| ☐ | | Oct 2015 -- Jan 2016 | 0 |
| ☐ | Ending Balance | Jan 2013 -- Sep 2015 | Starting Balance + Total Earnings |
| ☐ | | Oct 2015 -- Jan 2016 | 0 |
| ☐ | Periodic ROR | Jan 2013 -- Aug 2013 | (Total Earnings / Starting Balance) * 100.0 |
| ☐ | | Sep 2013 | (Total Earnings / Starting Balance) + Earnings from Gold |
| ☐ | | Oct 2013 -- Jul 2015 | (Total Earnings / Starting Balance) * 100.0 |
| ☐ | | Aug 2015 | 40.0 + (20.0 / 2.0) + Percent Gold |
| ☐ | | Sep 2015 | (Total Earnings / Starting Balance) * 100.0 |
| ☐ | | Oct 2015 -- Jan 2016 | 0 |

FIG. 9

Longer Investment Sim

Describe ▼ Toolbars ▼ | Both ▽ | ———— R D T | Simulate! Restore Abbrevs ☐

Ranges: ○ Relative ● Absolute | Save

Earnings from Stocks @ Feb 2013:  Starting Balance * (Percent Stocks / 100.0) * (ROR Stocks / 100.0)

— 360, 359, 371, 371, 14'

Main

| Plan Attributes | | | | | | 2013 | | | | | | |
|---|---|---|---|---|---|---|---|---|---|---|---|---|
| Name | Jan 2013 | Feb 2013 | Mar 2013 | Apr 2013 | May 2013 | Jun 2013 | Jul 2013 | Aug 2013 | Sep 2013 | Oct 2013 | Nov 2013 | D |
| Starting Balance | 185,000 | 181,300 | 182,388 | 175,457 | 214,409 | 225,129 | 236,385 | 248,205 | 260,615 | 273,646 | 389,124 | |
| Percent Stocks | 40 | 40 | 40 | 40 | 40 | 40 | 40 | 40 | 40 | 40 | 40 | |
| Percent Bonds | 40 | 40 | 40 | 20 | 40 | 40 | 40 | 40 | 40 | 40 | 40 | |
| Percent Gold | 20 | 20 | 20 | 20 | 20 | 20 | 20 | 20 | 20 | 20 | 20 | |
| ROR Stocks | 7 | 7 | -15 | 50 | 7 | 7 | 7 | 7 | 7 | 100 | 7 | |
| ROR Bonds | -15 | -8 | 3 | 3 | 3 | 3 | 3 | 3 | 3 | 3 | 3 | |
| ROR Gold | 6 | 5 | 5 | 5 | 5 | 5 | 5 | 5 | 5 | 5 | 5 | |
| Earnings from Stocks | 5,180 | 5,076 | -10,943 | 35,091 | 6,003 | 6,304 | 6,619 | 6,950 | 7,297 | 109,458 | 10,895 | |
| Earnings from Bonds | -11,100 | -5,802 | 2,189 | 2,105 | 2,573 | 2,702 | 2,837 | 2,978 | 3,127 | 3,284 | 4,669 | |
| Earnings from Gold | 2,220 | 1,813 | 1,824 | 1,755 | 2,144 | 2,251 | 2,364 | 2,482 | 2,606 | 2,736 | 3,891 | |
| Total Earnings | -3,700 | 1,088 | -6,931 | 38,951 | 10,720 | 11,256 | 11,819 | 12,410 | 13,031 | 115,478 | 19,456 | |
| Ending Balance | 181,300 | 182,388 | 175,457 | 214,409 | 225,129 | 236,385 | 248,205 | 260,615 | 273,646 | 389,124 | 408,580 | |
| Periodic ROR | -2 | 1 | -4 | 22 | 5 | 5 | 5 | 5 | 5 | 42 | 5 | |

FIG. 10

Longer Investment Sim

Describe ▼ | Toolbars ▼ | Both ▽ | ∨ A ⊞ ──R─D─T─ Simulate! Restore Abbrevs ☐
Ranges: ○ Relative  ● Absolute  Save Earnings from Stocks @ Feb 2013: | Starting Balance * (Percent Stocks / 100.0) * (ROR Stocks / 100.0)

Main

| Plan Attributes | | | | | | 2013 | | | | | | |
|---|---|---|---|---|---|---|---|---|---|---|---|---|
| Name | Jan 2013 | Feb 2013 | Mar 2013 | Apr 2013 | May 2013 | Jun 2013 | Jul 2013 | Aug 2013 | Sep 2013 | Oct 2013 | Nov 2013 | D |
| Starting Balance | 185,000 | 181,300 | 182,388 | 175,457 | 214,409 | 225,129 | 236,385 | 248,205 | 260,615 | 273,646 | 389,124 | |
| Percent Stocks | 40 | 40 | 40 | 40 | 40 | 40 | 40 | 40 | 40 | 40 | 40 | |
| Percent Bonds | 40 | 40 | 40 | 40 | 40 | 40 | 40 | 40 | 40 | 40 | 40 | |
| Percent Gold | 20 | 20 | 20 | 20 | 20 | 20 | 20 | 20 | 20 | 20 | 20 | |
| ROR Stocks | 7 | 7 | -15 | 50 | 7 | 7 | 7 | 7 | 7 | 100 | 7 | |
| ROR Bonds | -15 | -8 | 3 | 3 | 3 | 3 | 3 | 3 | 3 | 3 | 3 | |
| ROR Gold | 6 | 5 | 5 | 5 | 5 | 5 | 5 | 5 | 5 | 5 | 5 | |
| Earnings from Stocks | 5,180 | 5,076 | -10,943 | 35,091 | 6,003 | 6,304 | 6,619 | 6,950 | 7,297 | 109,458 | 10,895 | |
| Earnings from Bonds | -11,100 | -5,802 | 2,189 | 2,105 | 2,573 | 2,702 | 2,837 | 2,978 | 3,127 | 3,284 | 4,669 | |
| Earnings from Gold | 2,220 | 1,813 | 1,824 | 1,755 | 2,144 | 2,251 | 2,364 | 2,482 | 2,606 | 2,736 | 3,891 | |
| Total Earnings | -3,700 | 1,088 | -6,931 | 38,951 | 10,720 | 11,256 | 11,819 | 12,410 | 13,031 | 115,478 | 19,456 | |
| Ending Balance | 181,300 | 182,388 | 175,457 | 214,409 | 225,129 | 236,385 | 248,205 | 260,615 | 273,646 | 389,124 | 408,580 | |
| Periodic ROR | -2 | 1 | -4 | 22 | 5 | 5 | 5 | 5 | 5 | 42 | 5 | |

Longer Investment Sim

Describe ▼ Toolbars ▼ | Both ▼ | A □ ∨
Ranges: ○ Relative ● Absolute | Save
362, 366, 364
R D T Simulate! Restore Abbrevs □

Earnings from Stocks @ Feb 2013: Starting Balance * (Percent Stocks / 100.0) * (ROR Stocks / 100.0)

Main | Plan Attributes

| Name | Jan 2013 | Feb 2013 | Mar 2013 | Apr 2013 | May 2013 | Jun 2013 | Jul 2013 | Aug 2013 | Sep 2013 | Oct 2013 | Nov 2013 | D |
|---|---|---|---|---|---|---|---|---|---|---|---|---|
| Starting Balance | 185,000 | 181,300 | 182,388 | 175,457 | 214,409 | 225,129 | 236,385 | 248,205 | 260,615 | 273,646 | 389,124 | |
| Percent Stocks | 40 | 40 | 40 | 40 | 40 | 40 | 40 | 40 | 40 | 40 | 40 | |
| Percent Bonds | 40 | 40 | 40 | 40 | 40 | 40 | 40 | 40 | 40 | 40 | 40 | |
| Percent Gold | 20 | 20 | 20 | 20 | 20 | 20 | 20 | 20 | 20 | 20 | 20 | |
| ROR Stocks | 7 | 7 | -15 | 50 | 7 | 7 | 7 | 7 | 7 | 100 | 7 | |
| ROR Bonds | -15 | -8 | 3 | 3 | 3 | 3 | 3 | 3 | 3 | 3 | 3 | |
| ROR Gold | 6 | 5 | 5 | 5 | 5 | 5 | 5 | 5 | 5 | 5 | 5 | |
| Earnings from Stocks | 5,180 | 5,076 | -10,943 | 35,091 | 6,003 | 6,304 | 6,619 | 6,950 | 7,297 | 109,458 | 10,895 | |
| Earnings from Bonds | -11,100 | -5,802 | 2,189 | 2,105 | 2,573 | 2,702 | 2,837 | 2,978 | 3,127 | 3,284 | 4,669 | |
| Earnings from Gold | 2,220 | 1,813 | 1,824 | 1,755 | 2,144 | 2,251 | 2,364 | 2,482 | 2,606 | 2,736 | 3,891 | |
| Total Earnings | -3,700 | 1,088 | -6,931 | 38,951 | 10,720 | 11,256 | 11,819 | 12,410 | 13,031 | 115,478 | 19,456 | |
| Ending Balance | 181,300 | 182,388 | 175,457 | 214,409 | 225,129 | 236,385 | 248,205 | 260,615 | 273,646 | 389,124 | 408,580 | |
| Periodic ROR | -2 | 1 | -4 | 22 | 5 | 5 | 5 | 5 | 5 | 42 | 5 | |

Highlighting enabled

ClearFactor Plan Report for Longer Investment Sim — 226 - 246

Statistics ☑ Highlighting — 172

| | Attribute | Time Period | Description |
|---|---|---|---|
| ☐ | Starting Balance | Jan 2013 | 185,000 |
| ☐ | | Feb 2013 -- Sep 2015 | Ending Balance from prior period |
| ☐ | | Oct 2013 -- Jan 2016 | 0 |
| ☐ | Percent Stocks | Entire plan | 0 -- 40 avg: 37.84 distinct 2 |
| ☐ | Percent Bonds | Entire plan | 0 -- 40 avg: 35.68 distinct 2 |
| ☐ | Percent Gold | Entire plan | 0 -- 20 avg: 17.84 distinct 2 |
| ☐ | ROR Stocks | Entire plan | -15 -- 100 avg: 9.41 distinct 6 |
| ☐ | ROR Bonds | Entire plan | -15 -- 22 avg: 2.41 distinct 5 |
| ☐ | ROR Gold | Entire plan | 0 -- 6 avg: 4.49 distinct 3 |
| ☐ | Earnings from Stocks | Jan 2013 -- Sep 2015 | Starting Balance * (Percent Stocks / 100.0) * (ROR Stocks / 100.0) |
| ☐ | | Oct 2015 -- Jan 2016 | 0 |
| ☐ | Earnings from Bonds | Jan 2013 -- Sep 2015 | Starting Balance * (Percent Bonds / 100.0) * (ROR Bonds / 100.0) |
| ☐ | | Oct 2015 -- Jan 2016 | 0 |
| ☐ | Earnings from Gold | Jan 2013 -- Sep 2015 | Starting Balance * (Percent Gold / 100.0) * (ROR Gold / 100.0) |
| ☐ | | Oct 2015 -- Jan 2016 | 0 |
| ☐ | Total Earnings | Jan 2013 -- Sep 2015 | Earnings from Stocks + Earnings from Bonds + Earnings from Gold |
| ☐ | | Oct 2015 -- Jan 2016 | 0 |
| ☐ | Ending Balance | Jan 2013 -- Sep 2015 | Starting Balance + Total Earnings |
| ☐ | | Oct 2015 -- Jan 2016 | 0 |
| ☐ | Periodic ROR | Jan 2013 -- Aug 2013 | (Total Earnings / Starting Balance) * 100.0 |
| ☐ | | Sep 2013 | 0 |
| ☐ | | Oct 2013 -- Jul 2015 | (Total Earnings / Starting Balance) * 100.0 |
| ☐ | | Aug 2015 | 40.0 + (20.0 / 2.0) + Percent Gold |
| ☐ | | Sep 2015 | (Total Earnings / Starting Balance) * 100.0 |
| ☐ | | Oct 2015 -- Jan 2016 | 0 |

Longer Investment Sim

| File ▼ | Configure ▼ | Toolbars ▼ | Edit | ☑ Auto Save | ☑ Variables | ☐ Drivers |

Description: | Starting Balance | Auto-Naming: | CamelBack Without Vowels | ∨ | Abbre Value: | 5076.4000000000

Earnings from Stocks at Feb 2013: | sBal*(prcntStks/100.0)*(ro

| Abbreviation | Description |
|---|---|
| periodicROR | Periodic ROR |
| rorBnds | ROR Bonds |
| rorGold | ROR Gold |
| rorStks | ROR Stocks |

420

Main

| Attribute | Abbrev | Jan | Feb | Mar |
|---|---|---|---|---|
| Starting Balance | sBal | 185,000.00 | 181,300.00 | 182,387.60 | 175 |
| Percent Stocks | prcntStks | 40.00 | 40.00 | 40.00 |
| Percent Bonds | prcntBnds | 40.00 | 40.00 | 40.00 |
| Percent Gold | prcntGld | 20.00 | 20.00 | 20.00 |
| ROR Stocks | rorStks | 7.00 | 7.00 | -15.00 |
| ROR Bonds | rorBnds | -15.00 | -8.00 | 3.00 |
| ROR Gold | rorGold | 6.00 | 5.00 | 5.00 |

*FIG. 18*

| Plan Attributes | 2012 | | 2013 | | | | | | | | | |
|---|---|---|---|---|---|---|---|---|---|---|---|---|
| Name | Nov 2012 | Dec 2012 | Jan 2013 | Feb 2013 | Mar 2013 | Apr 2013 | May 2013 | Jun 2013 | Jul 2013 | Aug 2013 | Sep 2013 |
| Users | 80.00 | 88.00 | 61.60 | 67.76 | 74.54 | 81.99 | 163.98 | 180.38 | 198.41 | 218.26 | 240.08 |
| Users Growth Rate | 1.10 | .70 | 1.10 | 1.10 | 1.10 | 2.00 | 1.10 | 1.10 | 1.10 | 1.10 | 1.10 |
| Plans | 3.00 | 3.03 | 3.06 | 3.09 | 3.12 | 3.15 | 3.18 | 3.22 | 3.25 | 3.28 | 3.31 |
| Plans Growth Rate | 1.01 | 1.01 | 1.01 | 1.01 | 1.01 | 1.01 | 1.01 | 1.01 | 1.01 | 1.01 | 1.01 |
| Total Number of Plans | 240.00 | 266.64 | 188.51 | 209.44 | 232.89 | 258.52 | 522.20 | 580.17 | 644.56 | 716.11 | 795.60 |
| Subscription Rate | 5.00 | 15.00 | 10.00 | 10.00 | 10.00 | 10.00 | 10.00 | 10.00 | 10.00 | 10.00 | 10.00 |
| Gross Revenue | 1,200.00 | 3,999.60 | 1,885.14 | 2,094.40 | 2,326.87 | 2,585.16 | 5,222.02 | 5,801.66 | 6,445.64 | 7,161.11 | 7,955.99 |
| Accumulated Gross Revenue | 1,200.00 | 5,199.60 | 7,084.74 | 9,179.14 | 11,506.01 | 14,091.17 | 19,313.19 | 25,114.85 | 31,560.49 | 38,721.61 | 46,677.60 |
| AWS Expense | 40.00 | 176.00 | 123.20 | 135.52 | 149.07 | 163.98 | 327.96 | 360.75 | 396.83 | 436.51 | 480.16 |
| AWS User Group | 20.00 | 20.00 | 20.00 | 20.00 | 20.00 | 20.00 | 20.00 | 20.00 | 20.00 | 20.00 | 20.00 |
| AWS Cost Per Group | 10.00 | 40.00 | 40.00 | 40.00 | 40.00 | 40.00 | 40.00 | 40.00 | 40.00 | 40.00 | 40.00 |
| Gross Rev Less AWS | 1,160.00 | 3,823.60 | 1,126.64 | 1,958.88 | 2,177.80 | 2,421.18 | 4,894.06 | 5,440.91 | 6,048.82 | 6,724.60 | 7,475.83 |
| Accumulated Net Rev | 1,160.00 | 4,983.60 | 6,110.24 | 8,069.11 | 10,246.91 | 12,668.09 | 17,562.15 | 23,003.06 | 29,101.87 | 35,826.47 | 43,302.30 |

| Simple business plan | | | | | | | | | | | | |
|---|---|---|---|---|---|---|---|---|---|---|---|---|
| Describe ▼ Toolbars ▼ | Both ▼ | A ━━━━●━━━━ R D T | Simulate! Restore Abbrevs ☐ | | | | | | | | | |
| Calc Type: Multiply ▼ Magnitude: | 100.00 | Magnitude Type: Percent ▼ | Result Type: Actual Values ▼ | ━━●━━ | VBH | Repeat Apply Restore | | | | | | |
| Main | | | | | | | | | | | | |
| Plan Attributes | 2012 | | 2013 | | | | | | | | | |
| Name | Nov 2012 | Dec 2012 | Jan 2013 | Feb 2013 | Mar 2013 | Apr 2013 | May 2013 | Jun 2013 | Jul 2013 | Aug 2013 | Sep 2013 | Oct 2013 |
| Users | 80.00 | 88.00 | 61.60 | 67.76 | 74.54 | 81.99 | 163.98 | 180.38 | 198.41 | 218.26 | 240.08 | 264.09 |
| Users Growth Rate | 1.10 | .70 | 1.10 | 1.10 | 1.10 | 2.00 | 1.10 | 1.10 | 1.10 | 1.10 | 1.10 | 2.00 |
| Plans | 3.00 | 3.03 | 3.06 | 3.09 | 3.12 | 3.15 | 3.18 | 3.22 | 3.25 | 3.28 | 3.31 | 3.35 |
| Plans Growth Rate | 1.01 | 1.01 | 1.01 | 1.01 | 1.01 | 1.01 | 1.01 | 1.01 | 1.01 | 1.01 | 1.01 | 1.01 |
| Total Number of Plans | 240.00 | 266.64 | 188.51 | 209.44 | 232.89 | 258.52 | 522.20 | 580.17 | 644.56 | 716.11 | 795.60 | 883.91 |
| Subscription Rate | 5.00 | 15.00 | 10.00 | 10.00 | 10.00 | 10.00 | 10.00 | 10.00 | 10.00 | 10.00 | 10.00 | 10.00 |
| Gross Revenue | 1,200.00 | 3,999.60 | 1,885.14 | 2,094.40 | 2,326.87 | 2,585.16 | 5,222.02 | 5,801.66 | 6,445.64 | 7,161.11 | 7,955.99 | 8,839.11 |
| Accumulated Gross Revenue | 1,200.00 | 5,199.60 | 7,084.74 | 9,179.14 | 11,506.01 | 14,091.17 | 19,313.19 | 25,114.85 | 31,560.49 | 38,721.61 | 46,677.60 | 55,516.71 |
| AWS Expense | 40.00 | 176.00 | 123.20 | 135.52 | 149.07 | 163.98 | 327.96 | 360.75 | 396.83 | 436.51 | 480.16 | 528.18 |
| AWS User Group | 20.00 | 20.00 | 20.00 | 20.00 | 20.00 | 20.00 | 20.00 | 20.00 | 20.00 | 20.00 | 20.00 | 20.00 |
| AWS Cost Per Group | 10.00 | 40.00 | 40.00 | 40.00 | 40.00 | 40.00 | 40.00 | 40.00 | 40.00 | 40.00 | 40.00 | 40.00 |
| Gross Rev Less AWS | 1,600.00 | 3,823.60 | 1,126.64 | 1,958.88 | 2,177.80 | 2,421.18 | 4,894.06 | 5,440.91 | 6,048.82 | 6,724.60 | 7,475.83 | 8,310.93 |
| Accumulated Net Rev | 1,600.00 | 4,983.60 | 6,110.24 | 8,069.11 | 10,246.91 | 12,668.09 | 17,562.15 | 23,003.06 | 29,101.87 | 35,826.47 | 43,302.30 | 51,613.23 |
| Database size | .80 | .88 | .62 | .68 | .75 | .82 | 1.64 | 55.79 | 61.98 | 68.86 | 76.50 | 84.99 |

*FIG. 23*

Simple business plan

Describe ▼ Toolbars ▼ | Both ▽ | A ⬜━━━━▶ R D T | Simulate! Restore Abbrevs ☐

Calc Type: Multiply ▽ Magnitude: ⬜━━━━ 100.00 Magnitude Type: Percent ▽ Result Type: Actual Differential Valu ▽ ⬜━━━━ VBH Repeat Apply Restore — 476 — 492

Main

| Plan Attributes | 2012 | | | 2013 | | | | | | | | |
|---|---|---|---|---|---|---|---|---|---|---|---|---|
| Name | Nov 2012 | Dec 2012 | Jan 2013 | Feb 2013 | Mar 2013 | Apr 2013 | May 2013 | Jun 2013 | Jul 2013 | Aug 2013 | Sep 2013 | Oct 2013 |
| Users | | | | | | | | | | | | |
| Users Growth Rate | | | | | | | | | | | | |
| Plans | | | | | 3.12 | 3.15 | 3.18 | 3.22 | 3.25 | 3.28 | 3.31 | 3.35 |
| Plans Growth Rate | | | | 2.02 | | | | | | | | |
| Total Number of Plans | | | | | 232.59 | 258.52 | 522.20 | 580.17 | 644.56 | 716.11 | 795.50 | 883.91 |
| Subscription Rate | | | | | | | | | | | | |
| Gross Revenue | | | | | 2,326.87 | 2,585.16 | 5,222.02 | 5,801.66 | 6,445.64 | 7,161.11 | 7,955.99 | 8,839.11 |
| Accumulated Gross Revenue | | | | | 2,326.87 | 4,912.03 | 10,134.05 | 15,935.71 | 22,381.35 | 29,542.46 | 37,498.46 | 46,337.57 |
| AWS Expense | | | | | | | | | | | | |
| AWS User Group | | | | | | | | | | | | |
| AWS Cost Per Group | | | | | | | | | | | | |
| Gross Rev Less AWS | | | | | 2,326.87 | 2,585.16 | 5,222.02 | 5,801.66 | 6,445.64 | 7,161.11 | 7,955.99 | 8,839.11 |
| Accumulated Net Rev | | | | | 2,326.87 | 4,912.03 | 10,134.05 | 15,935.71 | 22,381.35 | 29,542.46 | 37,498.46 | 46,337.57 |
| Database size | | | | | | | 111.57 | | 123.95 | 137.71 | 153.00 | 169.98 |

| Simple business plan | | | | | | | | | | | | |
|---|---|---|---|---|---|---|---|---|---|---|---|---|
| Describe ▼ Toolbars ▼ Both ▼ A ☐ ═══▶ R D T Simulate! Restore Abbrevs ☐ | | | | | | | | | | | | |
| Calc Type: Multiply ▼ Magnitude: ═══ 100.00 Magnitude Type: Percent ▼ Result Type: Actual Differential % ▼ ☐ VBH Repeat Apply Restore — 590 | | | | | | | | | | | | |
| Main | | | | | | | | | | | | |
| Plan Attributes | 2012 | | | | | 2013 | | | | | | |
| Name | Nov 2012 | Dec 2012 | Jan 2013 | Feb 2013 | Mar 2013 | Apr 2013 | May 2013 | Jun 2013 | Jul 2013 | Aug 2013 | Sep 2013 | Oct 2013 |
| Users | 80.00 | 88.00 | 61.60 | 67.76 | 74.54 | 81.99 | 163.98 | 180.38 | 198.41 | 218.26 | 240.08 | 264.09 |
| Users Growth Rate | 1.10 | .70 | 1.10 | 1.10 | 1.10 | 2.00 | 1.10 | 1.10 | 1.10 | 1.10 | 1.10 | 2.00 |
| Plans | 3.00 | 3.03 | 3.06 | 3.09 | 3.12 | 3.15 | 3.18 | 3.22 | 3.25 | 3.28 | 3.31 | 3.35 |
| Plans Growth Rate | 1.01 | 1.01 | 1.01 | 1.01 | 1.01 | 1.01 | 1.01 | 1.01 | 1.01 | 1.01 | 1.01 | 1.01 |
| Total Number of Plans | 240.00 | 266.64 | 188.51 | 209.44 | 232.89 | 258.52 | 522.20 | 580.17 | 644.56 | 716.11 | 795.60 | 883.91 |
| Subscription Rate | 5.00 | 15.00 | 10.00 | 10.00 | 10.00 | 10.00 | 10.00 | 10.00 | 10.00 | 10.00 | 10.00 | 10.00 |
| Gross Revenue | 1,200.00 | 3,999.60 | 1,885.14 | 2,094.40 | 4,653.75 | | | | | | | 17,678.22 |
| Accumulated Gross Revenue | 1,200.00 | 5,199.60 | 7,084.74 | 9,179.4 | 11,506.01 | 14,091.17 | 19,313.19 | 25,114.85 | 31,560.49 | 38,721.61 | 46,677.60 | 55,516.71 |
| AWS Expense | 40.00 | 176.00 | 123.20 | 135.52 | 149.07 | | | | | | | 528.18 |
| AWS User Group | 20.00 | 20.00 | 20.00 | 20.00 | 20.00 | 20.00 | 20.00 | 20.00 | 20.00 | 20.00 | 20.00 | 20.00 |
| AWS Cost Per Group | 10.00 | 40.00 | 40.00 | 40.00 | 40.00 | 40.00 | 40.00 | 40.00 | 40.00 | 40.00 | 40.00 | 40.00 |
| Gross Rev Less AWS | 1,600.00 | 3,823.60 | 1,126.64 | 1,958.88 | 2,177.80 | 2,421.18 | 4,894.06 | 5,440.91 | 6,048.82 | 6,724.60 | 7,475.83 | 8,310.93 |
| Accumulated Net Rev | 1,600.00 | 4,983.60 | 6,110.24 | 8,069.11 | 12,573.79 | 17,580.12 | 27,696.20 | 38,938.77 | 51,483.23 | 65,368.94 | 43,302.30 | 51,613.23 |
| Database size | .80 | .88 | .62 | .68 | .75 | .82 | 1.64 | 55.79 | 61.98 | 68.86 | 76.50 | 84.99 |

INTEGRATED, CONFIGURABLE, SENSITIVITY, ANALYTICAL, TEMPORAL, VISUAL ELECTRONIC PLAN SYSTEM

RELATED APPLICATIONS

This application claims the benefit of and priority to U.S. Provisional Application Ser. No. 61/845,536, filed on Jul. 12, 2013 under 35 U.S.C. §§119, 120, 363, 365, and 37 C.F.R. §1.55 and §1.78.

FIELD OF THE INVENTION

This invention relates to an integrated, configurable, sensitivity, analytical, temporal, visual electronic plan system.

BACKGROUND OF THE INVENTION

An electronic spreadsheet allows a user to enter a combination of data and formulaic relationships between the data into a matrix. Each cell of the matrix holds either a single data item or a formula describing the computed relationship to one or more other cells. The power of the electronic spreadsheet becomes readily apparent when one realizes that any given computed cell can serve as input data to another computed cell. This allows for financial data analysis models of arbitrary complexity to be constructed with any number of possible benefits to the user.

The flexibility and unstructured nature of a typical conventional electronic spreadsheet application may cause data modeling relationships that may become exceedingly difficult to understand, even by the original author of the spreadsheet. Additionally, changes to one part of the data model can lead to unexpected breakdowns elsewhere in the spreadsheet. Enacting counter-measures against such breakdowns is time-consuming, tedious and error-prone.

Additionally, for all of the computational capabilities of a typical spreadsheet application, the resulting analysis that can be performed is typically limited to changes in one or two independent variables at a time and then visually observing a few dependent variables downstream. In a complex data model, such as those found in a conventional electronic financial model, there may be many dependent and independent variables. Thus, it may be significantly challenging to be able to modify all of these variables and see the resulting changes in and from numerous potential inputs. As a result, there may be a reduction in understanding of the model itself. Highly-derived values and complex high-order relationships between various aspects of the model become extremely difficult to discern.

Conventional electronic spreadsheets used in financial modeling which include a temporal component may be referred to as electronic planning systems. Conventional electronic planning systems may enable users to build sophisticated financial models with complex formulaic relationships between various aspects of the model. "Sensitivity analysis" as used herein describes the study of one or more calculation results deriving from one or more changes to an input variable. Conventional electronic planning systems typically express the terms of the inputs to the analysis, the formulae, and outputs from the analysis in short cryptic abbreviated terms. This makes sensitivity analysis cumbersome and confusing because the short cryptic abbreviated terms may not clearly express their meaning in natural language terms that can be easily understood. As a result, there may be a reduction in understanding of the financial model itself. Highly-derived values and complex high-order relationships between various aspects of the model become extremely difficult to discern.

To overcome this, users often construct elaborate copies of input and output data to transform one or both data sets into terms more conducive to the desired analysis. Such a technique is tedious, error prone, can hide resulting calculation flaws, and cannot provide the needed sensitivity analysis. The workflow involved makes ad hoc analysis and data exploration next to impossible.

SUMMARY OF THE INVENTION

In one aspect, an integrated, configurable, sensitivity, analytical, temporal, visual system for an electronic plan system is featured. The system includes one or more programs, wherein the one or more programs are stored in a memory and configured to be executed by one or more processors, the programs including instructions to generate an electronic plan including one or more row descriptors each including a plurality of row descriptor properties, one or more column descriptors each including a plurality of column descriptor properties, one or more cells mapped to one of the row descriptors by a unique row descriptor identifier and to one of the of one of the column descriptors by a unique column descriptor identifier, each of the one or more cells including a numeric formula or a user-defined formula that references one or more other cells. An interpreter is configured to read each formula of the one or more cells and determine dependency data associated with each cell. A calculation engine responsive to the interpreter is configured to determine a numeric value of each of the one or more cells. A sensitivity analyzer responsive to a configurable user-initiated change to a value of a start cell is configured to activate the calculation engine to calculate the value of dependent cells affected by said change and visually highlight the dependent cells affected by the change in a predetermined sensitivity fog mat.

In one embodiment, the predetermined sensitivity format may include visually highlighting the dependent cells affected by the change of the value to the start cell. The predetermined sensitivity format may include user defined hiding of cells not affected by the change of the value to the start cell. The system may include a sensitivity analyzer input module for inputting the configurable user-initiated change to the value of the start cell. The configurable user-initiated change to the value of a start cell may include a combination of a calculation type, a magnitude, and a magnitude type. The sensitivity engine, in combination with said calculation engine, may be configured to change the value of all dependent cells of the plan based on the user specified combination. The calculation type may include multiply or add. The magnitude may have a non-zero numeric value. The magnitude type may include percent or actual. The combination may include a result type for displaying the visually highlighted dependent cells affected by the change. The result type may include actual values, actual differential values or actual differential percent. The system may include a storage device configured to store all data associated with the plan. The sensitivity analyzer may be configured to determine a differential between an original numeric value of each dependent cell affected by the change and the newly computed value of each said dependent cell. The sensitivity analyzer may be configured to highlight affected dependent cells in a highlighted gradient showing a proportion to the degree of differentiality. The differential may be expressed by one or more of percentage values, actual values, or actual differential values. The highlighted gradient may be configured to correlate with the degree of change of the value of said affected dependent cells relative to the original value of the dependent cells. The system may include a leverage report request module configured to set a user configurable default change in magnitude value and magnitude type to be applied to a user-specified collection of starting cells or root cells of the electronic plan. The leverage report module may be configured to identify the user-specified collection of starting cells in the plan or all root cells in the plan. The sensitivity analyzer, in response to the leverage report module, may be configured to calculate a new value for each of the collection of starting cells using the default change in magnitude and magnitude type. The sensitivity analyzer, in response to the leverage report module, may be configured to calculate a new value for each of the root cells using the default change in magnitude and magnitude type. The sensitivity analyzer, in combination with the calculation engine and the interpreter, may be configured to loop through all starting cells of the plan and calculate a new value for all cells depending on each starting cell using the default change in magnitude and magnitude type to generate a leverage result in a predetermined sensitivity format. The sensitivity analyzer may be configured to generate a leverage report including the collection of starting cells and all their dependent cells and the leverage result in the predetermined sensitivity format. The sensitivity analyzer, in combination with the calculation engine and the interpreter, may be configured to loop through all root cells of the plan and calculate a new value for all cells depending on each root cell using the default change in magnitude and magnitude type to generate a leverage result in a predetermined sensitivity format. The sensitivity analyzer may be configured to generate a leverage report including the collection of root cells and all their dependent cells and the leverage result in the predetermined sensitivity format.

In one aspect, a computer program product having program code stored on a non-transitory computer-readable medium, which when executed by at least one computing device, causes at least one computing device to generate an electronic plan is featured. The electronic plan includes one or more row descriptors each including a plurality of row descriptor properties, one or more column descriptors each including a plurality of column descriptor properties, one or more cells mapped to one of the row descriptors by a unique row descriptor identifier and to one of the column descriptors by a unique column descriptor identifier, each of the one or more cells including a numeric formula or a user-defined formula that references one or more other cells. An interpreter is configured to read each formula of the one or more cells and determine dependency data associated with each cell. A calculating engine responsive to the interpreter configured to determine a numeric value of each of the one or more cells. A sensitivity analyzer responsive to a configurable user-initiated change to a value of a start cell is configured to activate the calculation engine to calculate the value of dependent cells affected by said change and visually highlight the dependent cells affected by the change in a predetermined sensitivity format.

In one aspect, a method executing on a computing device for generating an integrated, configurable, sensitivity, analytical, temporal, visual system for an electronic plan is featured. The method includes assigning one or more row descriptors each including a plurality of row descriptor properties to one or more rows of an electronic plan, assigning one or more column descriptors each including a plurality of column descriptor properties to one or more columns of the electronic plan, mapping one or more cells to one or more row descriptors by a unique row descriptor identifier and to one of the column descriptors by a unique column descriptor identifier, each of the one or more cells including a numeric formula or a user-defined formula that references one or more other cells, reading each formula of the one or more cells and determining dependency data associated with each cell, determining a numeric value for each of the one or more cells, and in response to a configurable, user-initiated change to the value of a start cell, calculating the value of all dependent cells affected by said change and visually highlighting the dependent cells affected by the change in a predetermined sensitivity format.

In one embodiment, the method may include setting a user configurable default change in magnitude value and magnitude type to be applied to a collection of starting cells or root cells of the electronic plan. The method may include identifying a user-specified collection of starting cells in the plan or all root cells in the plan. The method may include calculating a new value for each of the starting cells or the root cells using the default change in magnitude and magnitude type. The method may include looping through all starting cells of the plan or all root cells of the plan and calculating a new value for each of the starting cells or the root cells and a new value for all cells depending on each starting cell or root cell using the default change in magnitude and magnitude type to generate a leveraged result in a predetermined sensitivity format.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 4 is a view of another example of an electronic plan generated by the system shown in FIGS. 1A-1B with row descriptors and column descriptors and an example of a user-defined formula associated with a particular cell expressed in abbreviated terms;

FIG. 5 is a view showing one example of abbreviations associated with the row descriptors shown in FIG. 4;

FIG. 6 is a view showing on example of a user-defined formula shown in FIG. 4 expressed in abbreviated terms now expressed in natural language terms;

FIG. 7 is a view showing one example of all natural language formulas associated with the plan shown in FIG. 4 for a selected time point grouped by root cells and dependent cells;

FIG. 8 is a view showing one example of self-describing spreadsheet report generated by the system shown in FIGS. 1A-1B which may include all the user-defined formulas for the entire plan shown FIG. 4 expressed in natural language terms with the formulas grouped by the time periods to which they apply within the grouping by row descriptor.

FIG. 9 is a view showing one example of the plan shown in FIG. 4 with dependent cells highlighted;

FIG. 10 is a view showing one example of the plan shown in FIG. 4 with root cells highlighted;

FIG. 11 is a view showing one example of the plan shown in FIG. 4 with terminal cells highlighted;

FIG. 12 is a view showing one example plan shown in FIG. 4 with root cells, dependent cells, and terminal cells highlighted;

FIG. 13 is a view showing one example of the plan shown in FIG. 4 with ancestry highlighting enabled showing the parent cells of the current cell;

FIG. 15 is a view showing one example of plan shown in FIG. 4 with ancestry highlighting enabled showing both parent cells and children cells of a current cell;

FIG. 16 is a view showing one example of a self-describing spreadsheet plan report generated by the system shown in one or more of FIGS. 1A-15 with visually highlighted root and dependent cells;

FIG. 17 is a view showing another example of a self-describing spreadsheet plan report generated by the system shown in one or more of FIGS. 1A-15;

FIG. 18 is a view showing one example of an auto-complete drop-down box which may be used to assist a user in entering one or more row descriptor abbreviations in a user-defined formula;

FIG. 20 is a view showing one example of a toolbar drop-down box which can be selected by a user to select the sensitivity mode toolbar shown in FIG. 21;

FIG. 21 is a view showing the selection of the sensitivity mode by a user and the associated sensitivity mode tool bar;

FIG. 22 shows in further detail the user-configurable options of the sensitivity toolbar shown in FIG. 21;

FIG. 23 shows a view where a user has selected a root or start cell from an electronic plan;

FIG. 26 shows a view of the example shown in FIG. 25 when the result type has been changed to actual differential values;

FIG. 27 shows a view of the example shown in FIG. 25 when the result type has been changed to actual differential %;

FIG. 28 is a view showing an example where previously unaffected cells can be shown using a slider;

FIG. 29 is a view showing one example of returning all affected cells to their original state;

Figure 31:
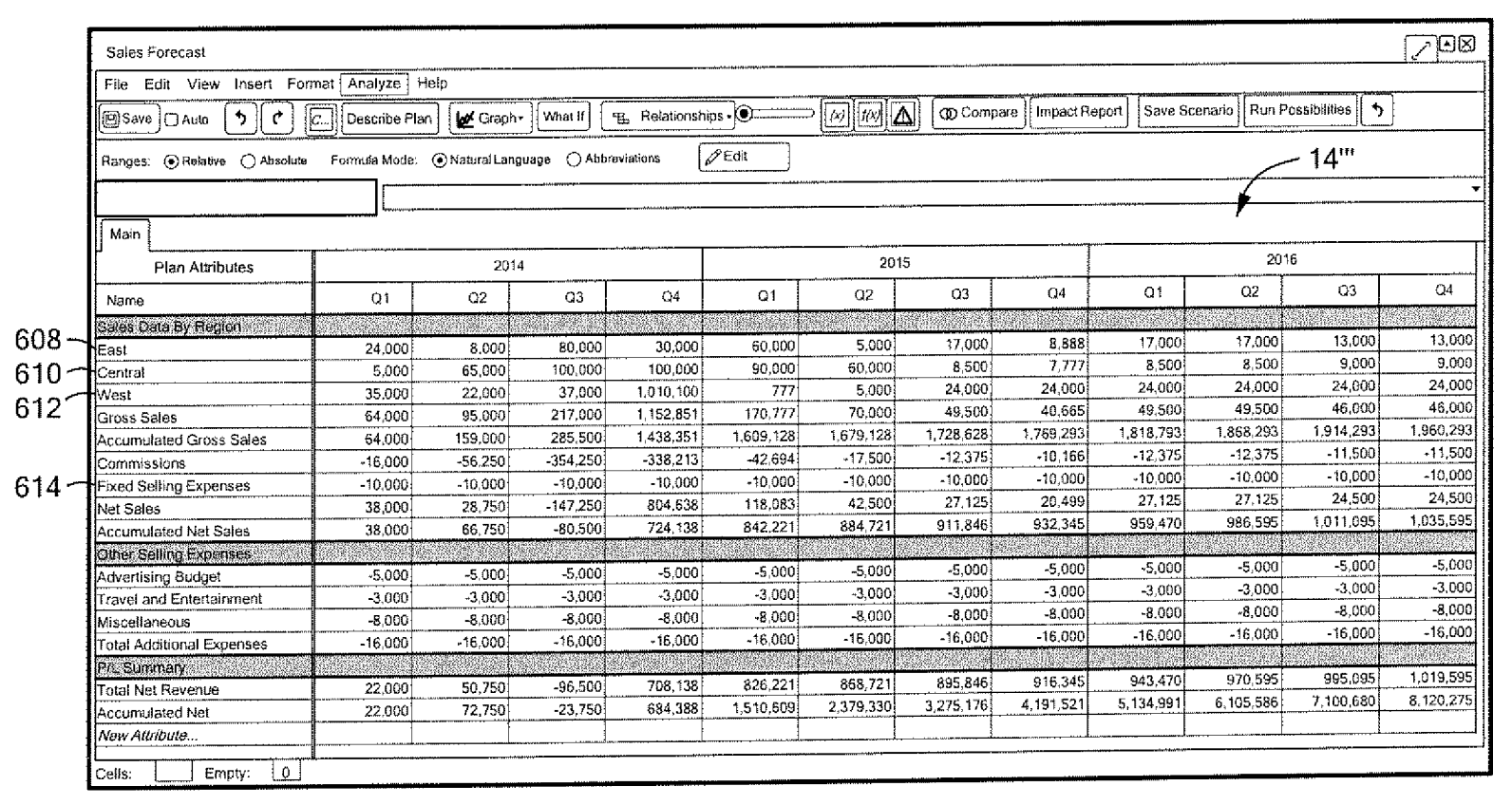

FIG. 31 is a view showing one example of a leverage report generated by the system shown in FIG. 30; and FIG. 32 is a view showing a leverage report with a leverage result generated by the system shown in FIG. 30.

DETAILED DESCRIPTION OF THE INVENTION

Figure 1A:
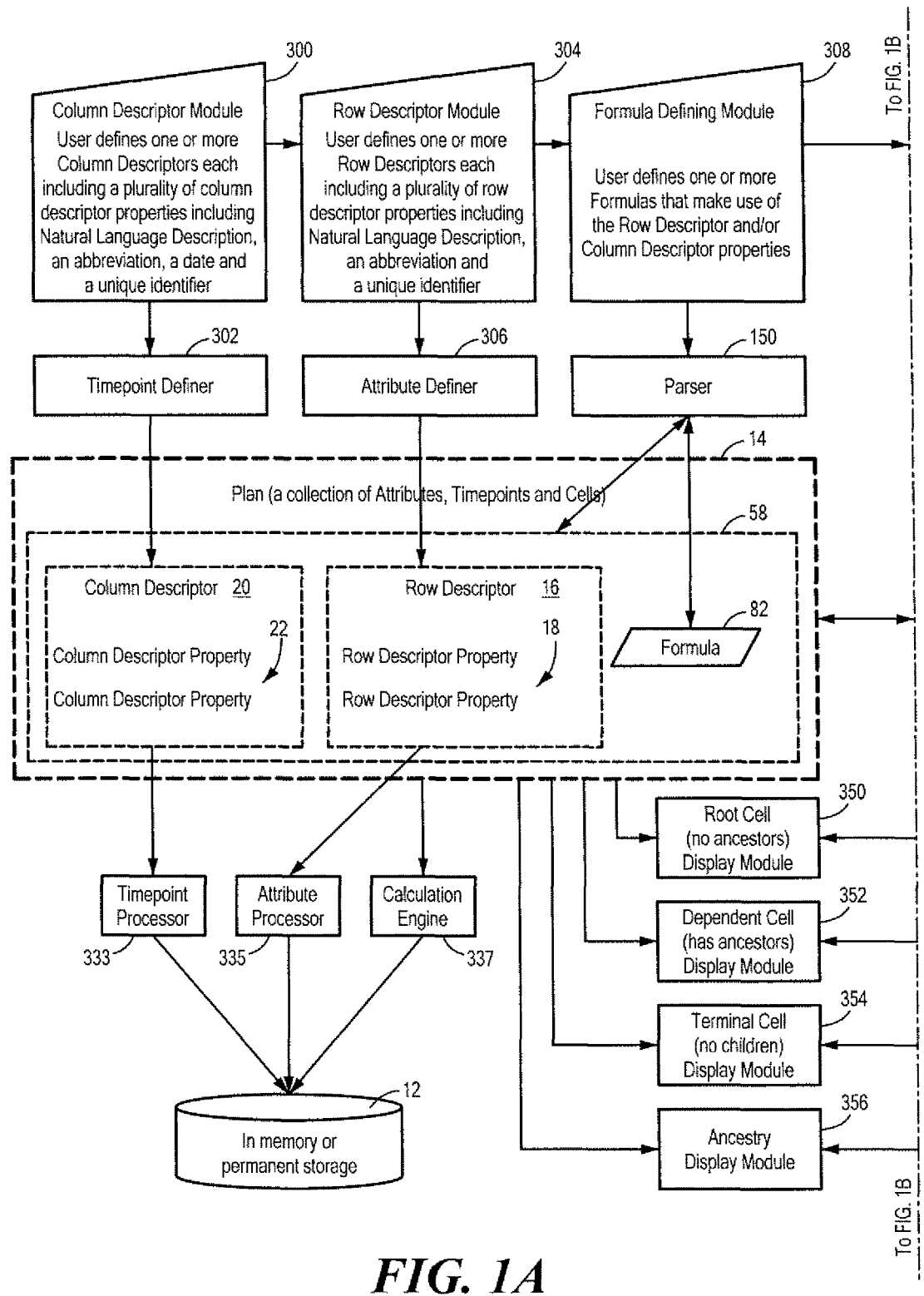
FIGS. 1A-1B are schematic block diagrams showing the primary components of one embodiment of the integrated, configurable, sensitivity, analytical, temporal, visual electronic plan system of this invention which may be used to express user-defined formulas in natural language terms or abbreviated terms.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As will be appreciated by one skilled in the art, one or more embodiments of this invention may be embodied as a system, method or computer program product. One or more embodiments this invention may take the form of an entirely hardware embodiment, an entirely software embodiment (including firmware, resident software, micro-code, and the like) or an embodiment combining software and hardware aspects that may all generally be referred to herein as a "module", "engine" or "system." One or more embodiments of this invention may take the form of a computer program product embodied in one or more computer-readable medium(s) having computer readable program code/instructions embodied thereon.

Any combination of computer-readable media or memory may be utilized. The computer-readable media or memory may be a computer-readable signal medium or a computer-readable storage medium. A computer-readable storage medium or memory may be, an electronic, magnetic, optical, electromagnetic, infrared, or semiconductor system, apparatus, or device, or any suitable combination of the foregoing. Other examples may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. As disclosed herein, the computer-readable storage medium or memory may be any tangible medium that can contain, or store one or more programs for use by or in connection with one or more processors on a company device such as a computer, a tablet, a cell phone, a smart device, or similar type device.

Computer program code for the one or more programs for carrying out the instructions or operation of one or more embodiments of this invention may be written in any combination of one or more programming languages, including an object oriented programming language, e.g., C++, Smalltalk, Java, and the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

One of more embodiments of this invention are disclosed below with reference to flowchart illustrations and/or block diagrams of methods, systems and computer program products. Each block of the flowchart illustrations and/or block diagrams, and combinations thereof may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1B:
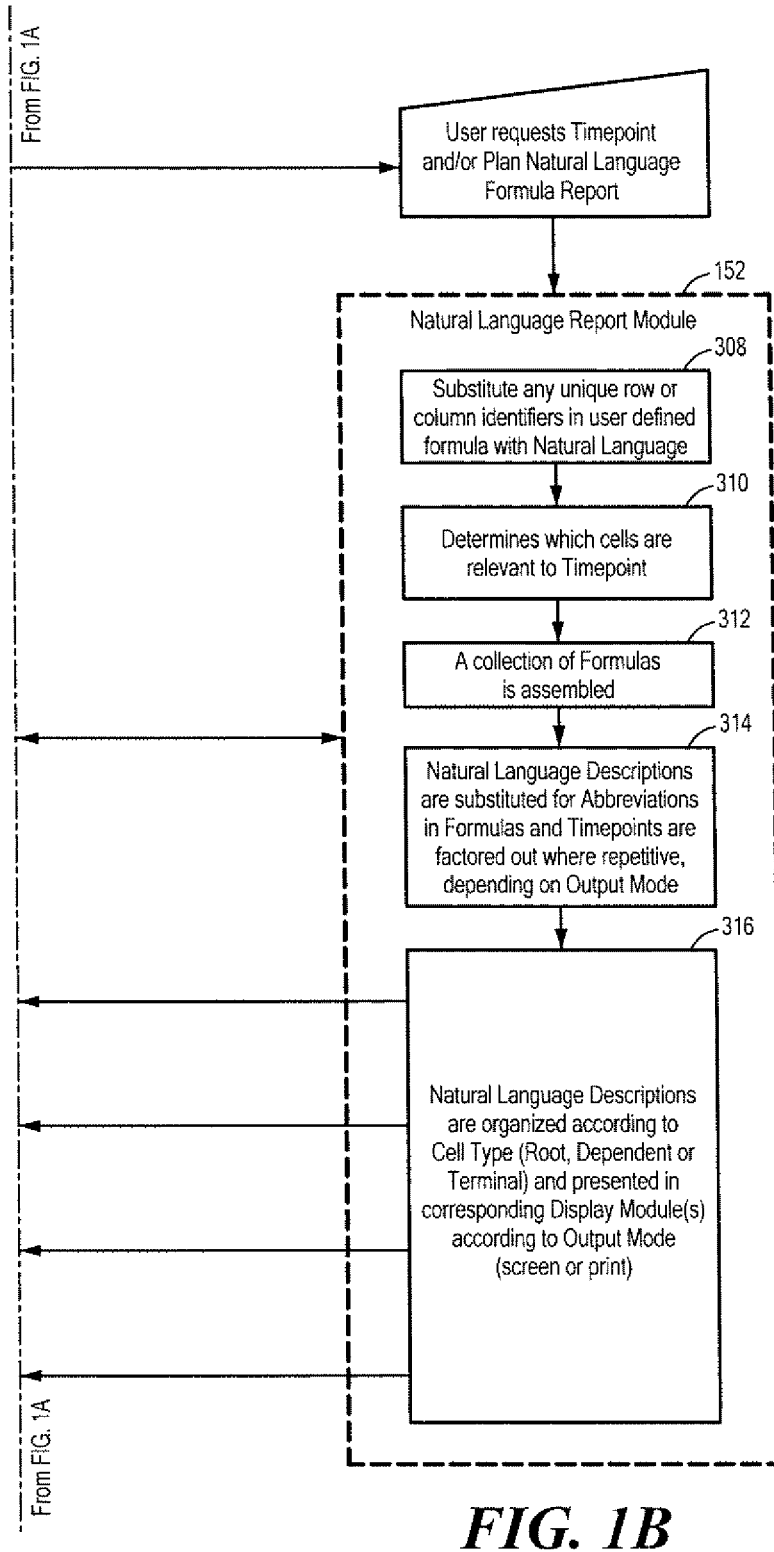

There is shown in FIGS. 1A-1B, one embodiment of integrated, configurable, sensitivity, analytical, temporal, visual electronic plan system 10 of this invention. System 10 includes one or more programs, wherein the one or more programs are stored in a memory, e.g., memory 12, and configured to be executed by one or more processors, e.g., one or more of processors 333, 335, 337, the programs including instructions to generate integrated, configurable, sensitivity, analytical, temporal, visual electronic plan system 10. System 10 includes electronic plan 14 including one or more row descriptors 16 each including a plurality of row descriptor properties 18. Electronic plan 14 also includes one or more column descriptors 20 each including a plurality of column descriptor properties 22. In one example, row descriptor properties 16 may include a natural language description, an abbreviation, and a unique row identifier. Similarly, column descriptor properties 22 may include a natural language description, an abbreviation, and a unique column identifier. In one design, column descriptor properties 22 and/or row descriptor properties 18 may include a time point, as discussed below.

Figure 2:
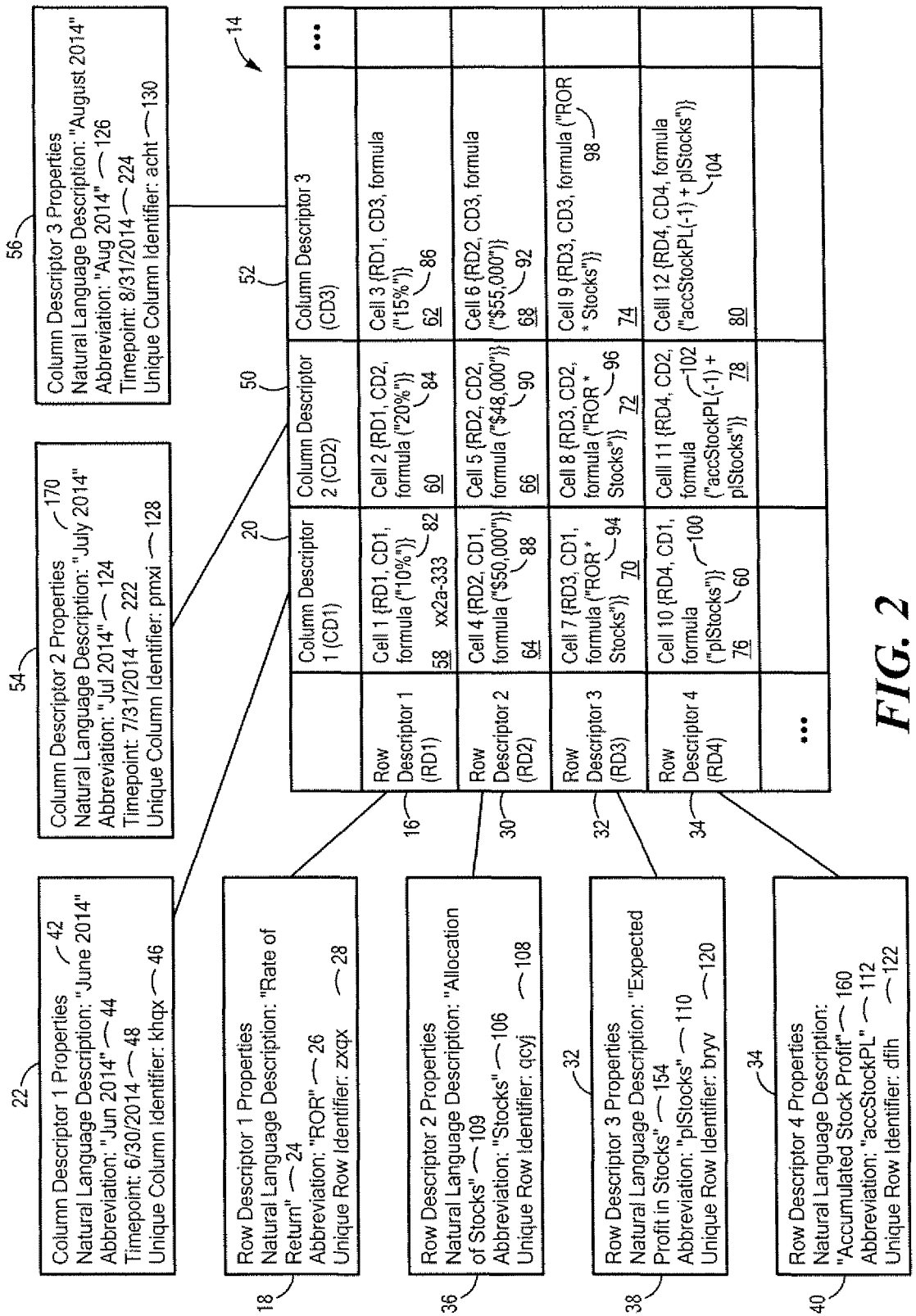
FIG. 2 is a schematic block diagram showing in further detail one example of the electronic plan system shown in FIGS. 1A-1B including row descriptors each having a plurality of row descriptor properties and column descriptors each having a plurality of column descriptors properties.

For example, FIG. 2, where like parts have been given like numbers, shown an example of plan 14 that includes row descriptor 16, indicated as "Row Descriptor 1 (RD1)" which includes a plurality of row descriptor properties 18. In this example, row descriptor properties 18 includes the natural language description "rate of return"-24, the abbreviation "ROR"-26, and a unique row identifier zxqx-28.

Plan 14 may include any number of row descriptors as needed to define plan 14. In this example, plan 14 may include row descriptor 30, indicated as Row Descriptor 2 (RD2), row descriptor 32, indicated as Row Descriptor 3 (RD3), and row descriptor 34, indicated as Row Descriptor 4 (RD4). Each of row descriptors 30, 32, and 34 includes a plurality of row descriptor properties, e.g., row descriptor properties 36, 38, and 40, respectively, which include a natural language description, an abbreviation, and a unique row identifier as shown.

Plan 14, FIGS. 1A-1B and 2, also includes column descriptor 20, indicated as "Column Descriptor 1 (CD1)", FIG. 2, which includes a plurality of column descriptor properties 22. In this example, column descriptor properties 20 preferably include the natural language description "June 2014"-42, the abbreviation "Jun 2014"-44, the unique column identifier khqx-46, and the time point "6/30/2014"-48.

Plan 14 may include any number of column descriptors as needed to define plan 14. For example, plan 14 may include column descriptor 50, indicated as Column Descriptor 2 (CD2) and column descriptor 52 indicated as column Descriptor 3 (CD3). Each of column descriptors 50 and 52 preferably include column descriptor properties 54 and 56, respectively, which may include a natural language description, an abbreviation, a unique row identifier and a time point as shown.

Although as shown in FIG. 2, plan 14 includes four row descriptors 18, 36, 38, 40 and three column descriptors 20, 50, and 52, plan 14 may include any number of row descriptors and column descriptors need to define plan 14, as known by those skilled in the art. In the example shown in FIG. 2, the column descriptor properties include the time point. In other examples, the row descriptor properties may include the time point.

Electronic plan 14, FIGS. 1A-1B and 2, also include one or more cells 58 mapped to one of the row descriptors by the unique row descriptor identifier and to one of the column descriptors by a unique column identifier. For example, plan 14, FIG. 2, may include cell 58, shown as "Cell 1", which is mapped to row descriptor 16 (RD1) by unique row identifier zxqx-28 and to column descriptor 20 (CD1) by unique column identifier khqx-46. Similarly, cell 60, shown as "Cell 2", is mapped to row descriptor 16 (RD1) by unique row identifier zxqx-28 and to column descriptor 30 by unique column identifier pmxi-128. In this example, cells 62-80 are preferably mapped in a similar manner to the row descriptors and the column descriptors by the unique row descriptor identifier and unique column description identifier as shown. Although as shown in FIG. 2, plan 14 includes cells twelve cells 58-80, this is for exemplary purposes only as plan 14 need only include at least one cell, e.g., cell 58, and may include any number of cells as needed to define an electronic plan as known by those skilled in the art.

Each of the one or more cells 58, FIG. 1A, includes its own formula 82. Formula 82 may be a user-defined formula that references one or more other cells or a numeric formula. For the example shown in FIG. 2, cells 58-68 include numeric formulas indicated at 82, 84, 86, 88, 90, and 92, respectively, and cells 70-80 include user-defined formulas indicated at 94, 96, 98, 100, 102, and 104, respectively, that reference one or more other cells.

The user-defined formula includes the unique row descriptor identifier and/or the unique column descriptor identifier from one or more other cells that are initially expressed by an abbreviation associated with a row descriptor and/or the abbreviation associated with the column descriptor. For example, cell 70 includes the user-defined formula 94 initially expressed in the abbreviated form "ROR*Stocks". The abbreviation "ROR", indicated at 26, is one of row descriptor properties 18 for row descriptor 16. Unique row identifier zxqx-28 is also one of the row descriptor properties 18 for row descriptor 16 and, as discussed above, is used to map at least cell 58. The abbreviation "Stocks", indicated at 106, in formula 94 is one of row descriptor properties 36 for row descriptor 30. Unique row identifier qcyj-108 is also one of the row descriptor properties 36 for row descriptor 30, used to map at least cell 64. Thus, the user-defined formula 94 in cell 70 initially expressed in the abbreviated terms "ROR*Stocks" includes unique row identifier zxqx-28 and unique row identifier qcyj-108 from cells 58 and 60. User-defined formulas 96-104 for cells 72-88 are similarly initially expressed in abbreviated terms and include the unique row identifiers as shown in one or more of row descriptor properties 18, 36, 38, and 40 as shown.

System 10, FIG. 1A, also includes parser 150, configured to translate the abbreviation for the row descriptor and/or the abbreviation for the column descriptor to its corresponding unique row descriptor identifier and/or unique column descriptor identifier. For example, parser 150 may translate any of the abbreviations associated with row descriptors 16, 30, 32, and 34, FIG. 2, e.g., abbreviation "ROR"-26, "Stocks"-106, "plStocks"-110 and "accStocksPL"-112 of row descriptor properties 18, 36, 38, and 40, respectively, to their corresponding unique row identifiers, e.g., zxqx-28, qcyj-108, bryw-120, an dfih-122, respectively. In this example, parser 150 may also translate any of the abbreviations associated with column descriptors 20, 50, and 52, e.g., the abbreviation "Jun 2014"-44, "Jul-2014"-124 or "Aug 2014"-126 of column descriptor properties 22, 54, and 56, respectively, to their corresponding unique column descriptor identifier, e.g., khqx-46, pmxi-128, and acht-130.

System 10, FIGS. 1A-1B, also includes natural report language module 152, FIG. 1B, configured to substitute any unique row identifier and/or any unique column descriptor identifier in the user-defined formula with a corresponding natural language description or abbreviation to render the user-defined formula in natural language terms or abbreviated terms, step 308. For example, FIG. 3, where like parts have been given like numbers, shown an example of plan 14 wherein natural report language module 152, FIG. 1B, has substituted unique row identifier zxqx-28 in the formula "ROR*stocks"-94 with the natural language description "Rate of Return"-24 and the substituted unique row identifier qcyj-108, with the natural language description "Allocation to Stocks"-109. The result is user-defined formula 94 initially expressed as "ROR*Stocks"-94 is now expressed in natural language terms as "Rate of Return*Allocation to Stocks", indicated at 154, FIG. 3.

Natural report language module 152, FIG. 1B, also preferably substitutes each of the unique row descriptor identifiers and each of the unique column descriptor identifiers used to map the one or more cells with the corresponding natural language description to identify each of the cells in the natural language terms.

Figure 3:
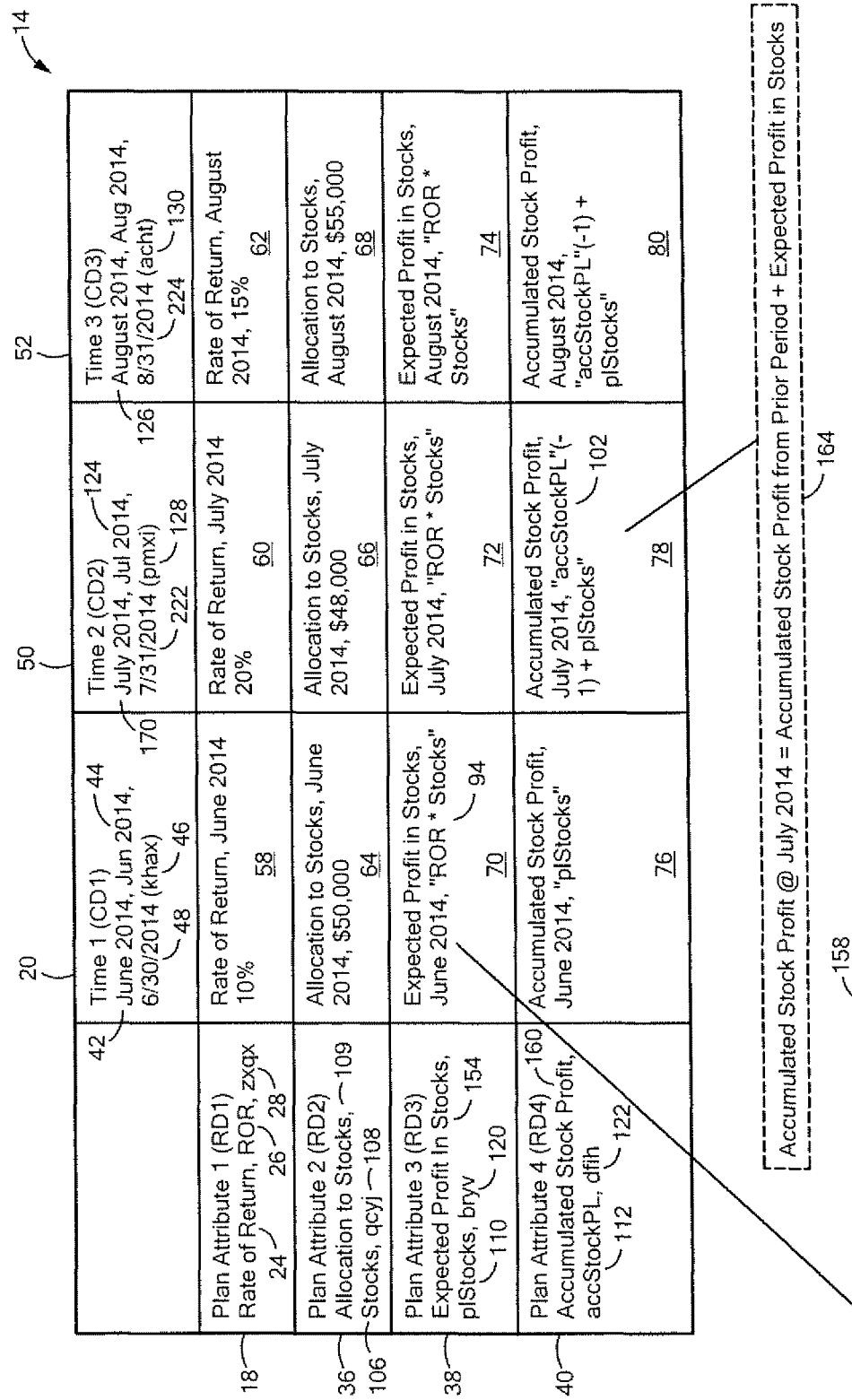
FIG. 3 is a schematic block diagram of the electronic plan shown in FIG. 2 showing examples of one or more cells mapped to row descriptors and the column descriptors and examples of user-defined formulas expressed in natural language teinis or a combination of natural language terms and abbreviated terms.

For example, natural report language module 152, FIG. 1B, preferably substitutes unique row identifier bryv-120, FIGS. 2 and 3 of row descriptor properties 38 with the natural language description "Expected Profit in Stocks"-154 and substitutes with unique column identifier khqx-46 with "June 2014"-42. Thus, cell 70 is identified as "Expected Profit in Stocks@ June 2014" indicated at 156. The result is system 10 displays cell 70 and formula 94 in natural language terms to yield the expression "Expected Profit in Stocks@ June 2014=Rate of Return*Allocation to Stocks"-158.

In the example above, natural language module 152 expressed user-defined formula 94 in natural language terms. In other examples, natural language module may express the user-defined formula in abbreviated terms, e.g., "ROR*Stocks" as discussed above and shown in FIGS. 2-4.

Figure 4:
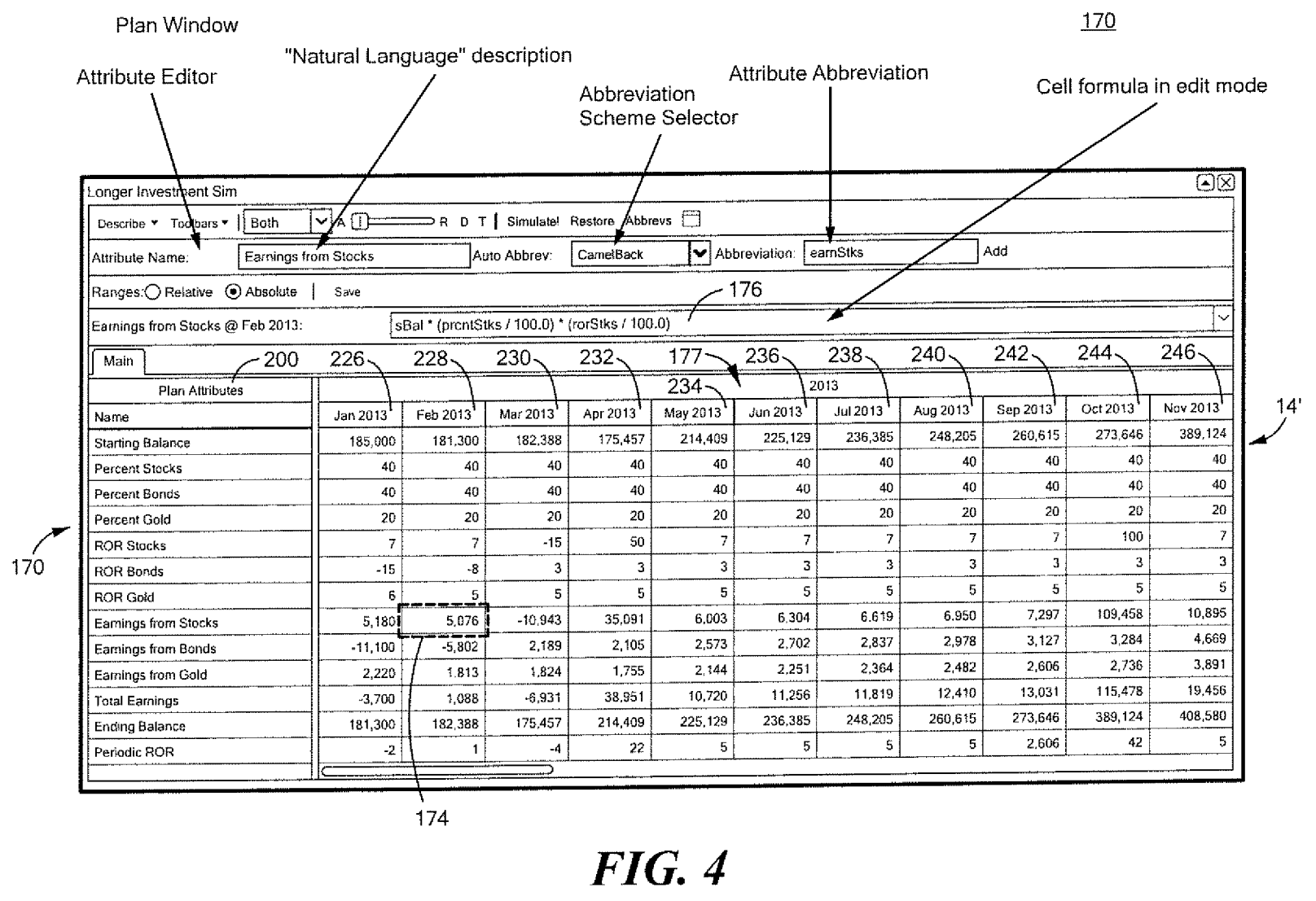

View 170, FIG. 4, shows one exemplary example of plan 14' including a plurality of row descriptors 170 each including a plurality of row descriptor properties, similar as discussed above with reference to FIGS. 2 and 3. Plan 14' also includes a plurality of column descriptors 172 each including a plurality of column descriptor properties. In this example, the user has clicked on cell 174 and the corresponding user-defined formula 176 expressed in abbreviated terms associated with cell 174 is displayed as shown.

Figure 5:
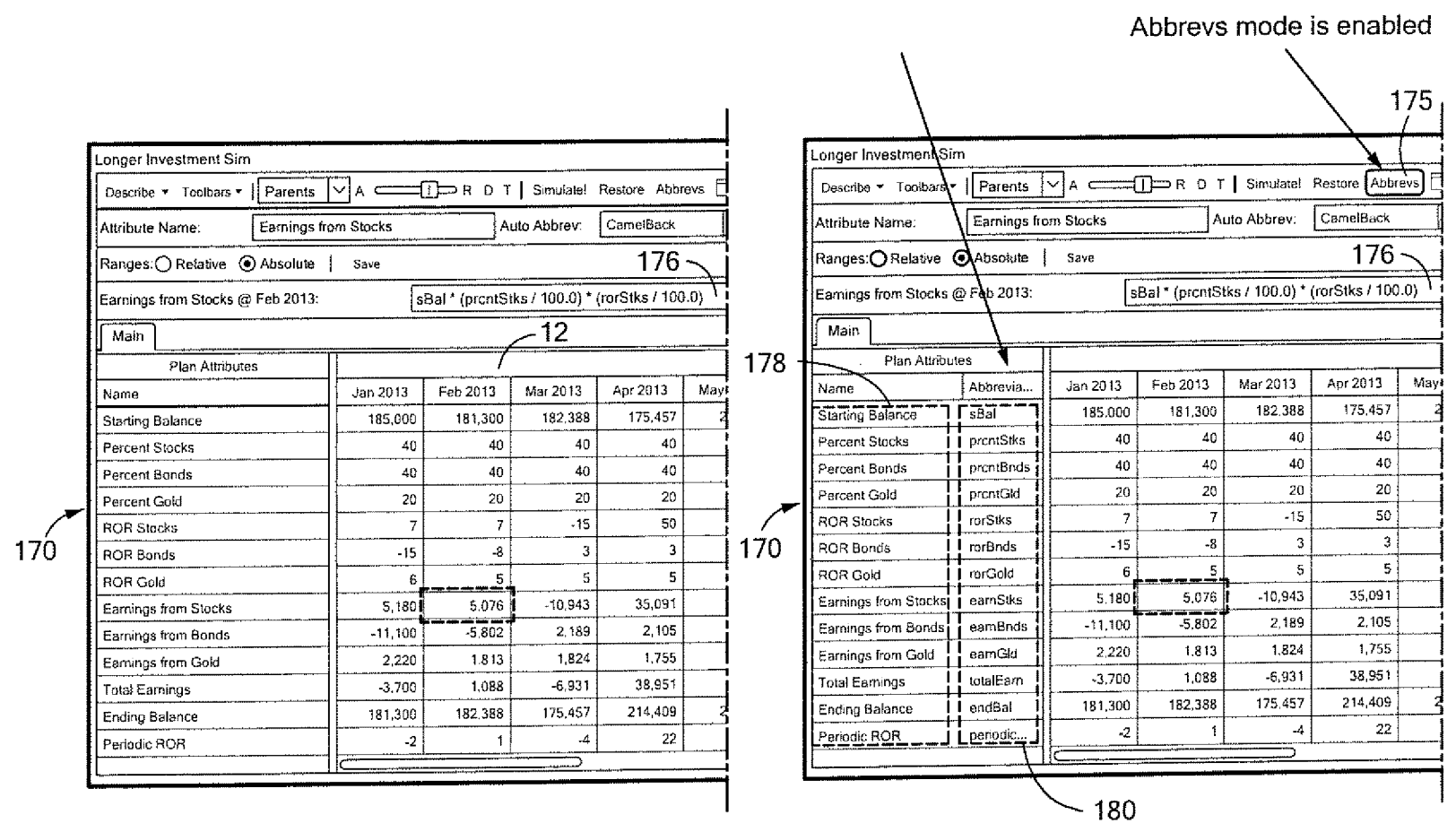

FIG. 5 shows examples of some of the row descriptor properties associated with each of row descriptors 170, e.g., the natural language description, indicated at 178 and the corresponding abbreviation for the natural language description, indicated at 180, enabled by clicking Abbrevs button 175. Each of the row descriptors 170, FIG. 4, have a unique row descriptor identifier and each of column descriptors 172 have a unique column descriptor identifier (not shown), similar as discussed above.

Figure 6:
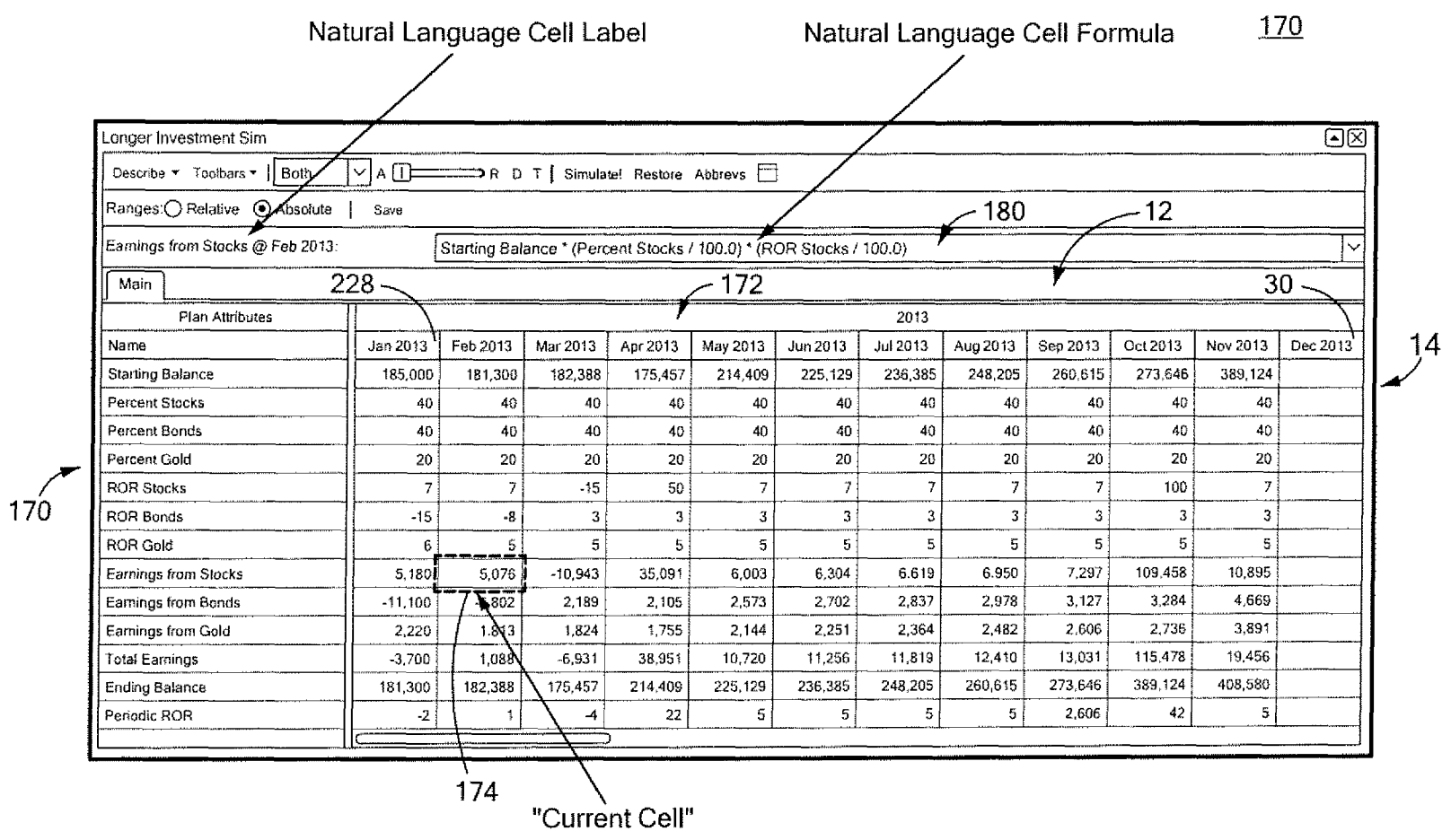

Natural language report module 152, FIG. 1B, then substitutes any unique row identifier and/or any unique column descriptor identifier in formula 176, FIG. 4, similar as discussed above with reference to one or more of FIGS. 1A-3, with the corresponding natural language description to render user-defined formula 176 in natural language terms or abbreviated terms, e.g., as shown at 180, FIG. 6.

The result is integrated, configurable, sensitivity, analytical, temporal, visual electronic plan system 10 of one or more embodiments of this invention displays user-defined formulas associated with plan 14 and in natural language terms that are easy to understand such that financial modeling can be easily performed. System 10 provides for improved understanding of the financial model associated with the plan and highly derived values and complex high order relationships between various aspects of the model are more easily discerned. System 10 allows the user to build sophisticated models with complex formulaic relationships between various aspects of the model with the user-defined formulas displayed with meaning that is easy to comprehend. Thus, cryptic formulas like +A2/C3*K2 are eliminated. System 10 also identifies each of the cells with natural language terms or abbreviated terms using row descriptor properties and column descriptor properties that are easy to understand.

In one embodiment, one or more of the row descriptors discussed above with reference to at least FIGS. 2-6 may be used to define one or more plan attributes. For example, one or more row descriptors 16, 30, 32, and 34, FIG. 2, or one or more row descriptors 170, FIG. 4, may be used to define Plan Attribute 1 (RD1), FIG. 3, Plan Attribute 2 (RD2), Plan Attribute 3 (RD3), and Plan Attribute 4 (RD4) or Plan Attributes 200, FIG. 4.

In one design, one or more column descriptors, e.g., column descriptors 20, 50, 52, FIG. 2, or column descriptors 172, FIG. 4, may be used to define one or more time points, e.g., Time 1 (CD1), FIG. 3, Time 2 (CD2), or Time 3 (CD3), or time points 226, 228, 230, 232, 234, 236, 238, 240, 242, 244, and 246, FIG. 4. Although as shown in this example, one or more row descriptors 18, 36, 38, 40, FIG. 3, or row descriptors 170, FIG. 4, may define plan attributes and one or more column descriptors 20, 50 and 52, FIG. 3, or column descriptors 172, FIG. 4, may define one or more time points, this is not a necessary limitation of this invention. In other examples, one or more row descriptors 18, 36, 38, 40 FIG. 2, or row descriptors 170, FIG. 4, may be used to define one or more time points and one or more of column descriptors 20, 50, 52, FIG. 2, or column descriptors 172, FIG. 4, may define one or more plan attributes.

In one example, time point specifiers may be included in the user-defined formula to make reference to the value of a cell not in the same time point as the current cell having the user-defined formula. This is achieved by adding the time point qualifier (+n/−n) to the abbreviation in the user-defined formula to specify a cell location in relative terms or with a column descriptor abbreviation to specify a particular cell in fixed terms. For example, user-defined formula 102, FIGS. 2-3, in cell 78 includes the term accStockPL(−1), where the "(−1)" is a time point specifier which refers to the time point for the prior cell 76, "Jun 2014"-44 which is expressed by natural language report module 152 as "from prior period", as shown by expression 164, FIG. 3. In another example, the time point specifier may be a column descriptor abbreviation, e.g., accStockPL(Jun 2014), where "Jun 2014"-44 is the column descriptor indicated at 44, FIGS. 2-3. If no time point specifiers are included, all of the values are assumed to come from the same point in time as the current cell having the user-defined formula. Formula parser 150 preferably determines the relationships/dependencies between the various cells when a time point specifier is used.

System 10, FIGS. 1A-1B, preferably includes column descriptor module 300 responsive to user input configured to define one or more of column descriptors 20, 50, 52, and 172, FIGS. 2-4, each including a plurality of column descriptor properties as discussed above. System 10 also preferably includes time point defining module 302 responsive to column descriptor module 300 configured to define a time point or a series of time points discussed above with reference to FIGS. 3 and 4.

System 10 also preferably includes row descriptor module 304 responsive to user input configured to define one or more row descriptors, e.g., row descriptors 16, 30, 32, and 34, FIGS. 2 and 3, or row descriptors 170, FIG. 4, each including a plurality of row descriptor properties including a natural language description, an abbreviation, and a unique row identifier as discussed above.

System 10 also preferably includes attribute definer 306, responsive to row descriptor module 304 configured to define one or more plan attributes, discussed above with reference to FIGS. 2-4. System 10 also preferably includes time point processor 333, attribute processor 335, and calculator engine 337.

System 10 also includes formula defining module 308 responsive to user input configured to define user-defined formulas discussed above.

In one embodiment, natural language report module 152, FIG. 1B, preferably determines which cells in plan 14, 14', FIGS. 3 and 4, are relevant to the user-defined time point, step 310. Natural language report module 152 then assembles a plurality of the user-defined formula associated with one or more cells relevant to the user-defined time period, step 312. Natural language report module 152 then substitutes any unique row descriptor identifier and/or any unique column descriptor identifier in the plurality of user-defined formula with the corresponding natural language description or abbreviation to render the plurality of user-defined formula in natural language or abbreviated terms, similar as discussed above, step 314. Natural language report module 152 also preferably factors out required but repetitive formula in step 314, and preferably organizes the generalized natural language terms according to cell type, e.g., a root cell, dependent cells or terminal cells and displays the results, step 316. FIG. 7 shows view 340 of an exemplary time point report generated by system 10 where all natural language formula for a selected time point, in this example, May 2013, indicated at 313, are grouped together by root cells 342 and dependent cells 344. As shown at 345, all of the formulae and computed values of the foiiuula for plan 14', FIG. 4, of the user selected time point are shown in generalized natural language terms which are easy to read and comprehend by the user to provide for easy financial modeling and analysis.

FIG. 8 shows an example of a user clicking plan 347 from Describe menu 349 such that system 10 generates a self-describing spreadsheet plan report generated by where all natural language formulae for an entire plan, e.g., plan 14', FIG. 4, are shown with distinct time period range descriptions grouped by attributes.

System 10, FIG. 1A, also preferably includes root cell display module 350 configured to determine and visually highlight root cells. System 10 also preferably includes dependency display module 352 configured to visually highlight and display dependent cells. System 10 also preferably includes terminal display module 354 configured to visually highlight and display terminal cells. System 10 also includes ancestry display module 356 configured to display the ancestry of root cells, dependent cells, and terminal cells.

Figure 10:
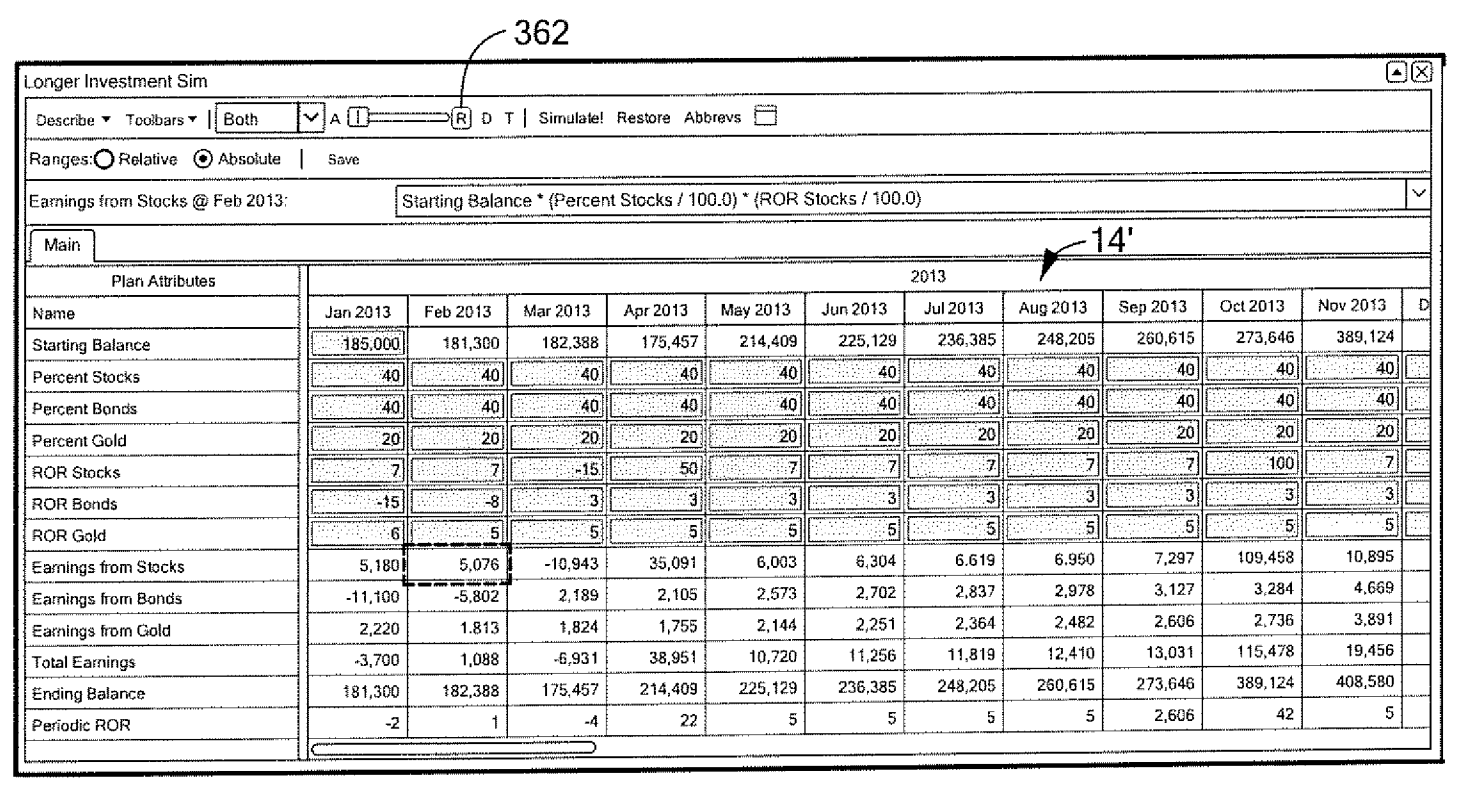
Figure 13:
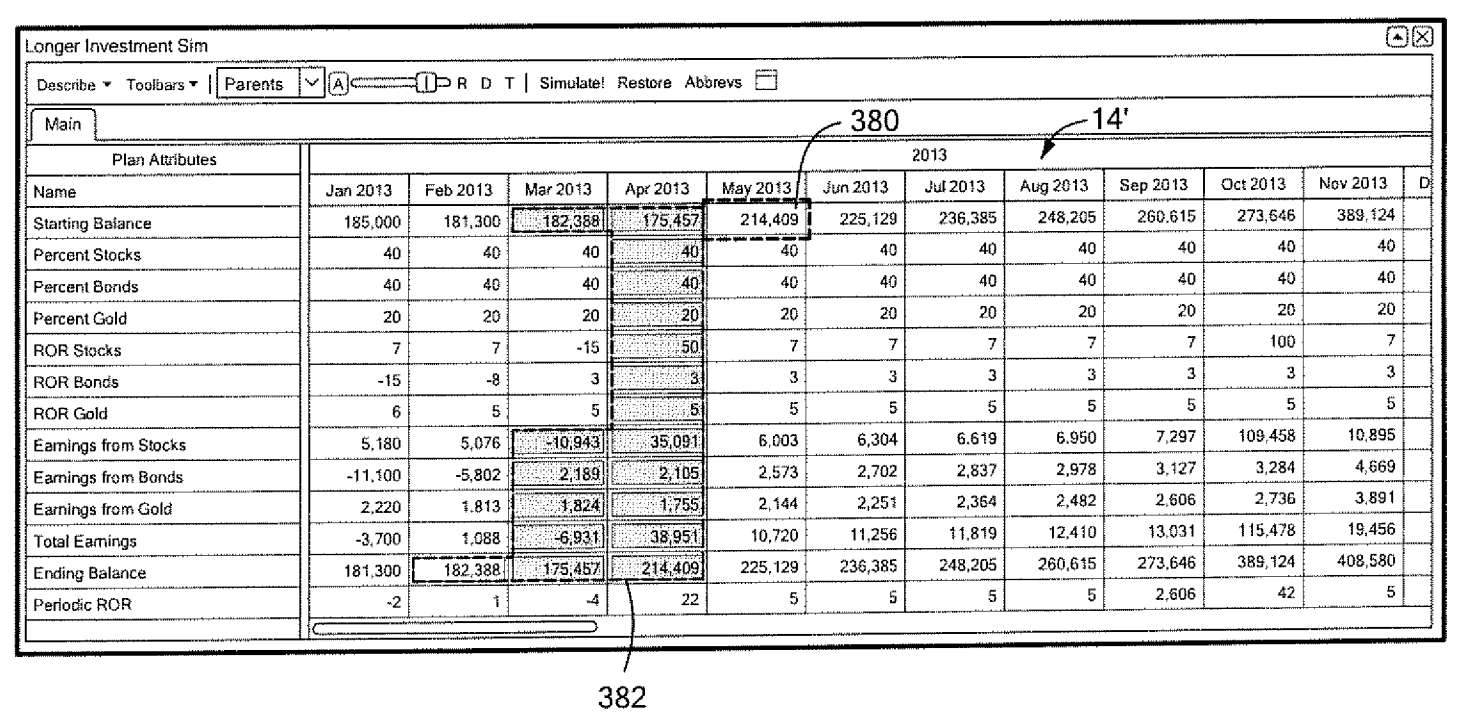
Figure 14:
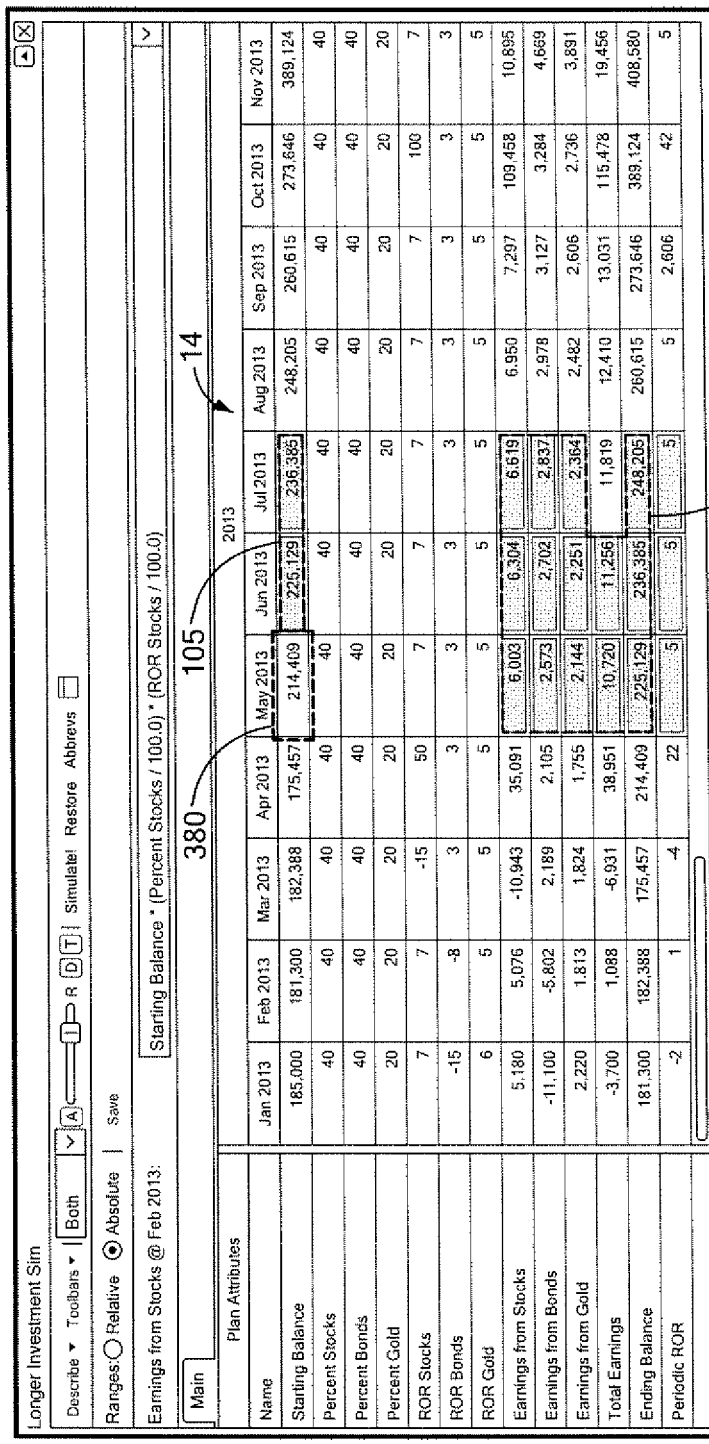
FIG. 14 is a view showing one example of the plan shown in FIG. 4 with ancestry highlighting enabled showing children cells of the current cell.
Figure 15:
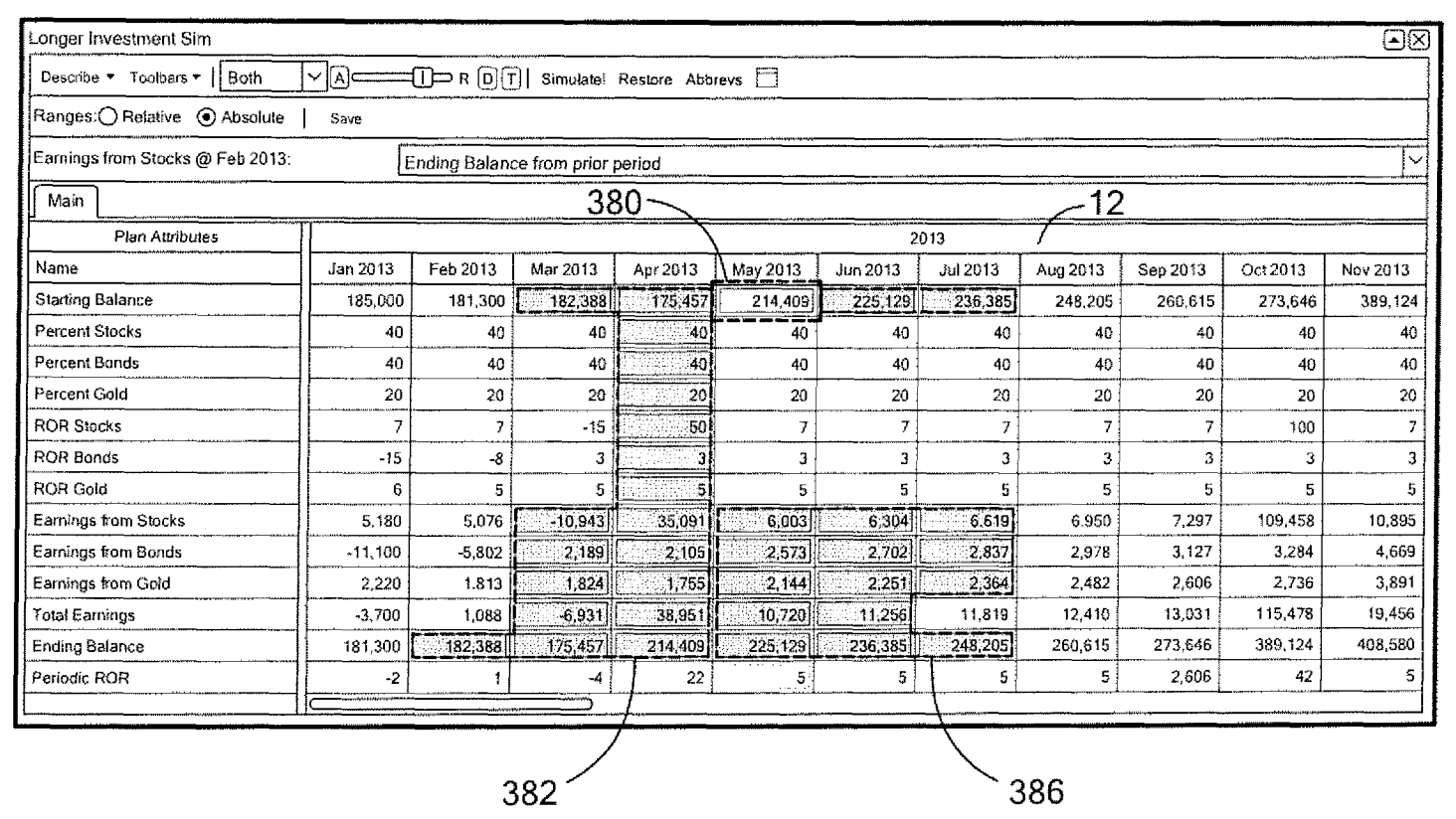

FIG. 9 shows an example of view 359 wherein dependent display module 352, FIG. 1A, in response to a user clicking D-Selector button 360, FIG. 9, has visually highlighted all the dependent cells of plan 14' indicated at 371. FIG. 10 shows an example wherein root cell display module 350, FIG. 1A, in response to user clicking R-Selector button 362, FIG. 10, has visually highlighted all the root cells of plan 14' as shown. FIG. 11 shows an example wherein terminal cell display module 354, Fig., in response to a user clicking T-Selector button 364, FIG. 11, has visually highlighted all the terminal cells of plan 14' as shown at 373. FIG. 12 shows an example wherein root cell display module 350, FIG. 1A, depended cell display module 352 and terminal cell display module 354, FIG. 1A, in response to a user clicking D-Selector button 366, FIG. 12, R-Selector button 362 and T-Selector button 364, has visually highlighted all the root, dependent, and terminal cells of plan 14', indicated at 368, 370, and 372, respectively. FIG. 13 shows an example wherein ancestry display module 356, FIG. 1A, has visually highlighted the parent ancestry of cell 380, FIG. 14, of plan 14' as shown by the gradient highlighting indicated at 382. FIG. 14 shows an example wherein ancestry display module 356, FIG. 1A, has visually highlighted the child ancestry of cell 380, FIG. 14, of plan 14' as shown by the gradient highlighting indicated at 386. FIG. 15 shows an example wherein ancestry display module 356, FIG. 1A, has visually highlighted both the parent and child ancestry of cell 380, FIG. 15, as shown by gradient highlighting indicated at 382 for the parent ancestry and gradient highlighting indicated at 386 for the child ancestry.

FIG. 16 depicts an example of view self-describing spreadsheet plan report generated by system 10, FIGS. 1A-1B, showing the optional highlighting of root and dependent cell ranges indicated by shading or color scheme, indicated at 390 and 392. FIG. 16 also shows row descriptor properties 170 and column descriptor properties 172 and series of time points 226-246 discussed above with reference to FIG. 4.

Figure 17:
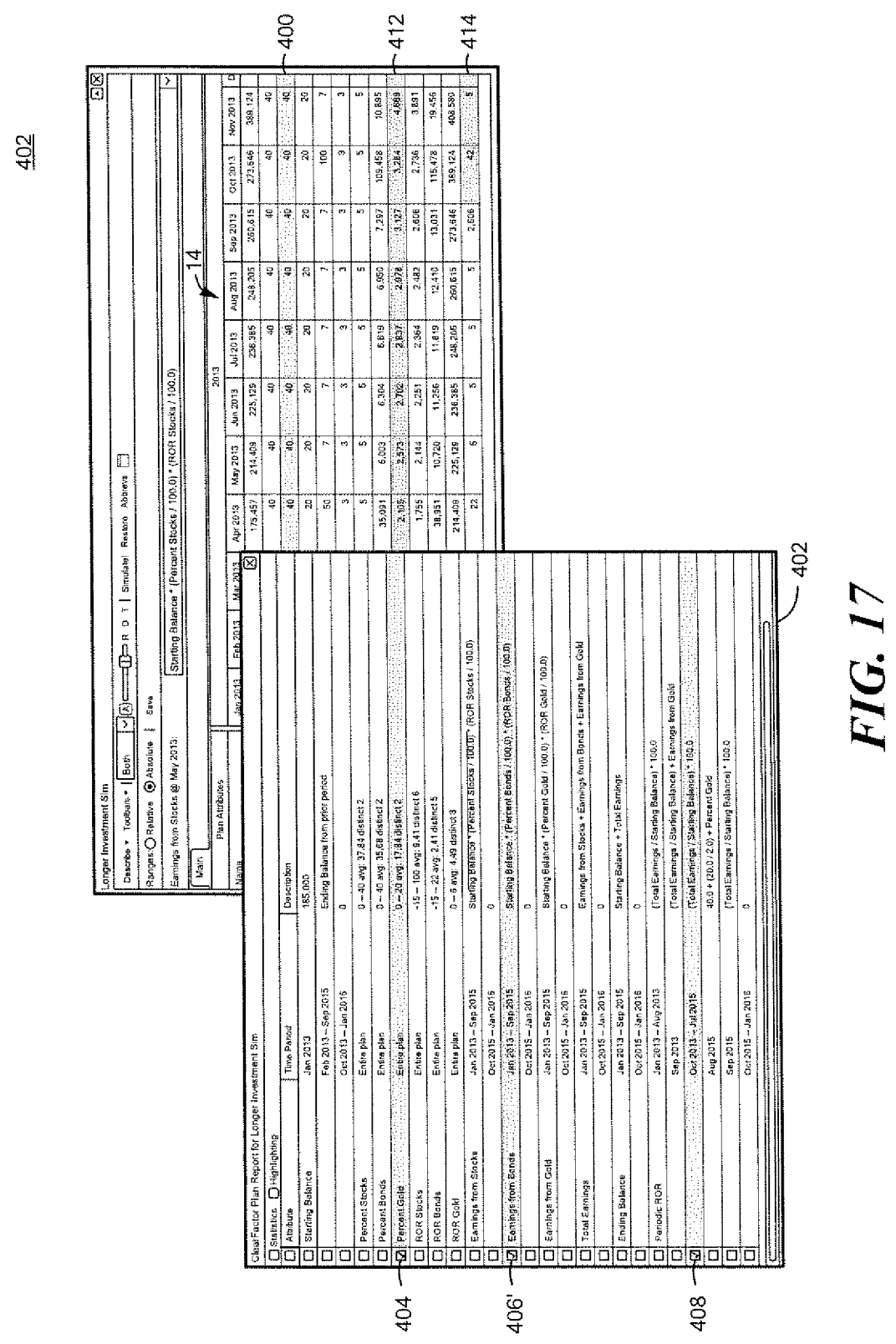

FIG. 17 shows one example of a self-describing spreadsheet plan report 402 generated by system 10, FIGS. 1A-1B, which can function as a selection mechanism for the plan. In this example, three time periods are selected on report 402, indicated at 404, 406, and 408, and the corresponding ranges are highlighted in plan 14' using consistent root and dependent cell highlighting, indicated at 410, 412 and 414.

Although, as discussed above with reference to at least FIG. 5, a user may enter a formula using abbreviations for the plan attributes using formula defining module 308 and the formula editor, this is not necessarily a limitation of this invention. In other embodiments, the user may use an auto-complete box drop-down to enter a letter or letters associated with the abbreviation of the row descriptor properties or column descriptor properties to be used in the user-defined formula, e.g., as shown by a user entering for "RO" and auto-complete drop-down box 420, FIG. 18, displays all of the abbreviations for row descriptors and/or column descriptors that begin with RO as shown.

Each of the one or more cells of plan 14, 14', shown in one or more of FIGS. 1A-17 preferably includes a unique cell identifier, e.g., cell 58, FIG. 2, including the unique cell identifier xx2q-333. In this example, each of cells 60-80 also has a unique cell identifier (not shown).

The user-defined formulas discussed above with reference to at last FIGS. 2-4, may be rendered with abbreviations for editing or rendered in natural language form for reporting. The user-defined formulas may also be rendered with encoding (for persistence) using the unique row descriptor identifiers, and/or column descriptor identifiers, e.g., @aid(zxqx) *@aid(9cy5) for user-defined formula 94, FIGS. 2 and 3. The encoding makes use of a private function in which parser 150, FIG. 1A, interprets to map that particular expression token to a particular property of a row descriptor or column descriptor. Formula defining module 308, FIG. 1A, a formula editor, and parser 150 allows the user to define cells that can contain formulas that relate cells to each other by using properties of the row descriptors and the column descriptors. In the abbreviations mode, this provides for easy semantic editing in a manner familiar to legacy spreadsheet syntax. In the encoded mode, the formula editor of system 10 provides for easy management and natural language and abbreviated mode rendering of the user-defined formulas. Abbreviations used during the creation of formulas, are automatically created but can be changed by the user due to the use of the unique column descriptor identifiers and/or the unique row descriptor identifiers. The formulas can be rendered in different styles and the natural language descriptions and/or abbreviations can be modified without breaking the relationship between cells and without breaking formulas. The result is system 10 provides the user with the ability to see natural language formulas derived from traditional looking spreadsheet formulas. That is, the user-defined formulas are represented by their abbreviations rather than meaningless references like "D4" and "G4" as found in conventional spreadsheets. The result is the user can easily apply a consistent formula to a specific range of cells that may not be in the entire row or column and easily apply an exceptional or different formula to a particular cell within a larger range. System 10 also can generate a report of all cell relationships in a plan where the descriptions have been analyzed and characterized according to the time period for which they apply. The data model allows for changes to be made to the natural language and abbreviation properties of the row descriptors and column descriptors that are automatically rendered to any formulas that reference them without having to reconfigure and/or persist new versions of those formulas.

Figure 19:
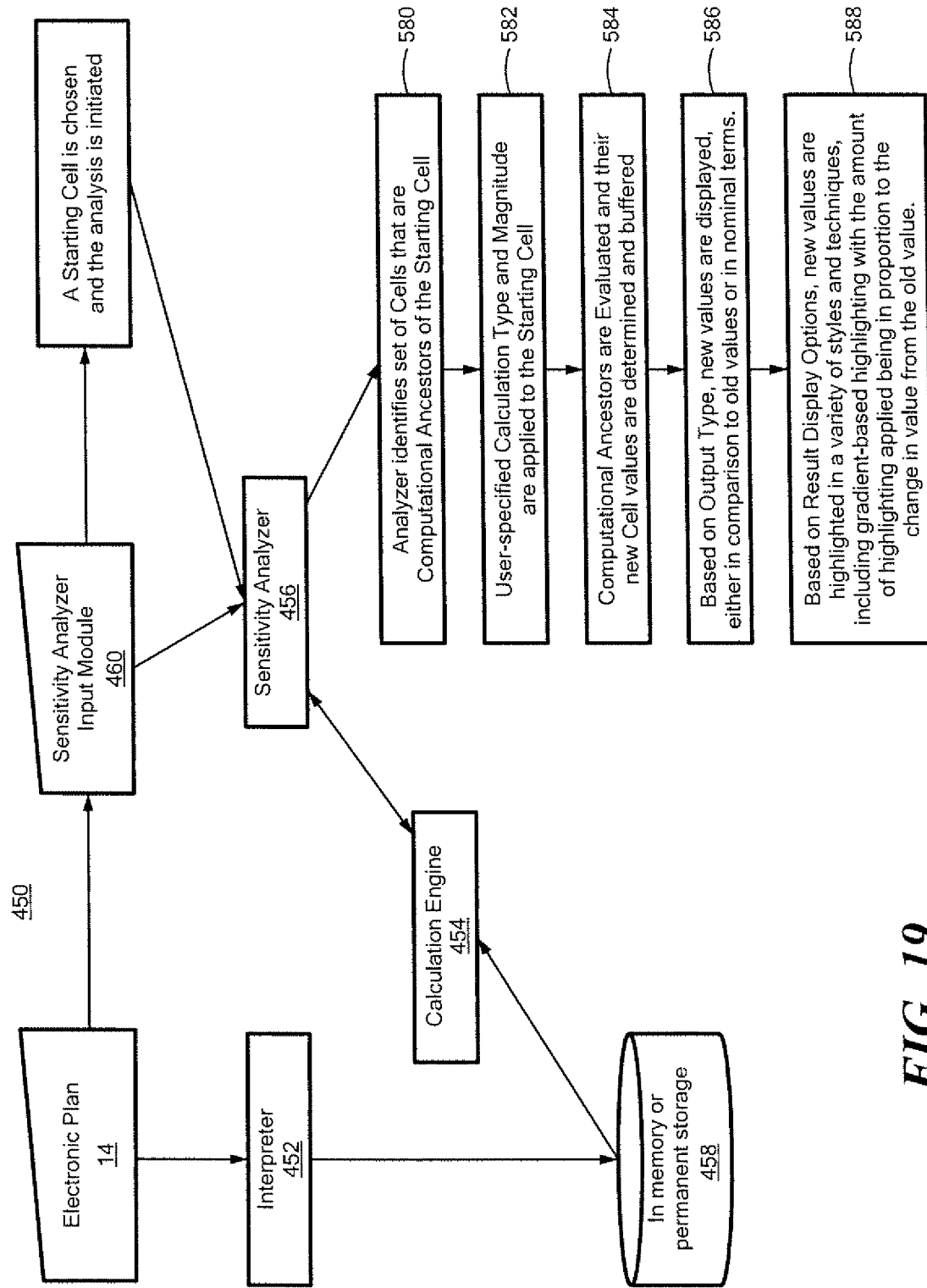
FIG. 19 is a schematic block-diagram showing the primary components of another embodiment of the integrated, configurable, sensitivity analytical, temporal, visual electronic plan system of this invention which may be used to provide sensitivity analysis.

Integrated, configurable, sensitivity, analytical, temporal, visual, system 450, FIG. 19, where like parts have been given like numbers, for an electronic plan of one embodiment of this invention includes electronic plan 14", FIG. 20, similar to plan 14, 14', discussed above with reference to at least FIGS. 1A-4. Electronic plan 14" similarly includes one or more row descriptors 170 including a plurality of row descriptor properties and one or more column descriptors 172 each including a plurality of column descriptor properties. Electronic plan 14" also includes one or more cells 173' mapped to one of the row descriptors by the unique row descriptor identifier and to one of the column descriptors by a unique column identifier, e.g., similar to cells 58-78 shown in FIGS. 2-3 or the cells 173 shown in FIG. 4.

System 450, FIG. 19, also includes interpreter 452 configured to read each formula of cells 173', FIG. 20, similar to the formulas shown in cells 58-80, FIGS. 2 and 3, or cells 173, FIG. 4, and determine dependency data associated with each cell as discussed above. System 450, FIG. 19, also includes calculation engine 454 responsive to interpreter 452 configured to determine a numeric value of each cell of the one or more cells 173 of plan 14". System 450 also includes sensitivity analyzer 456 responsive to a configurable user-initiated change to a value of a start cell input by sensitivity analyzer input module 460 (discussed below). Sensitivity analyzer 456 is configured to activate calculation engine 454 to calculate the value of all dependent cells affected by the change to the start cell and visually highlight the dependent cells affected by the change in a predetermined sensitivity format. In one example, the collection of start cells may be specified by the user, e.g., by clicking on one or more of cells 173'. The start cells may or may not be a root cells.

System 450 also preferably includes storage device 458 for storing all data associated with plan 14".

Figure 21:
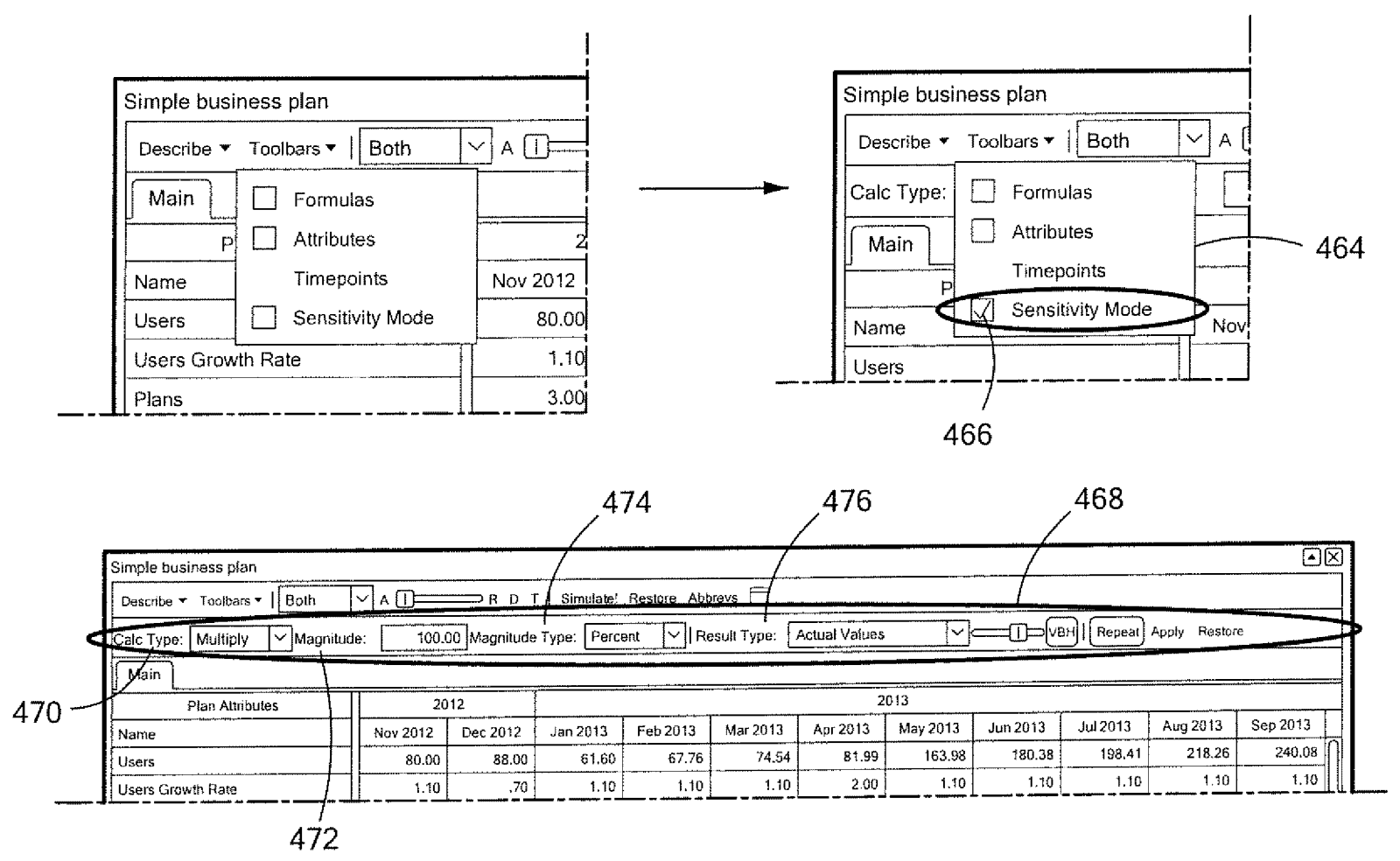

The configurable user-initiated change to the value of a start cell preferably includes a combination of a calculation type, a magnitude, and a magnitude type preferably input by a user with sensitivity analyzer input module 460. For example, FIG. 20 shows an example where a user has selected planning toolbar 462 which activates planning tool drop-down box 464, FIG. 21, which allows the user to select sensitivity mode checkbox 466 to enable the sensitivity mode feature of system 450. This causes system 450 to display sensitivity mode toolbar 468 which allows for the user to input calculation type 470, magnitude 472, and magnitude type 474. The user may also input result type 476 of the report to be generated by system 450.

Figure 22:
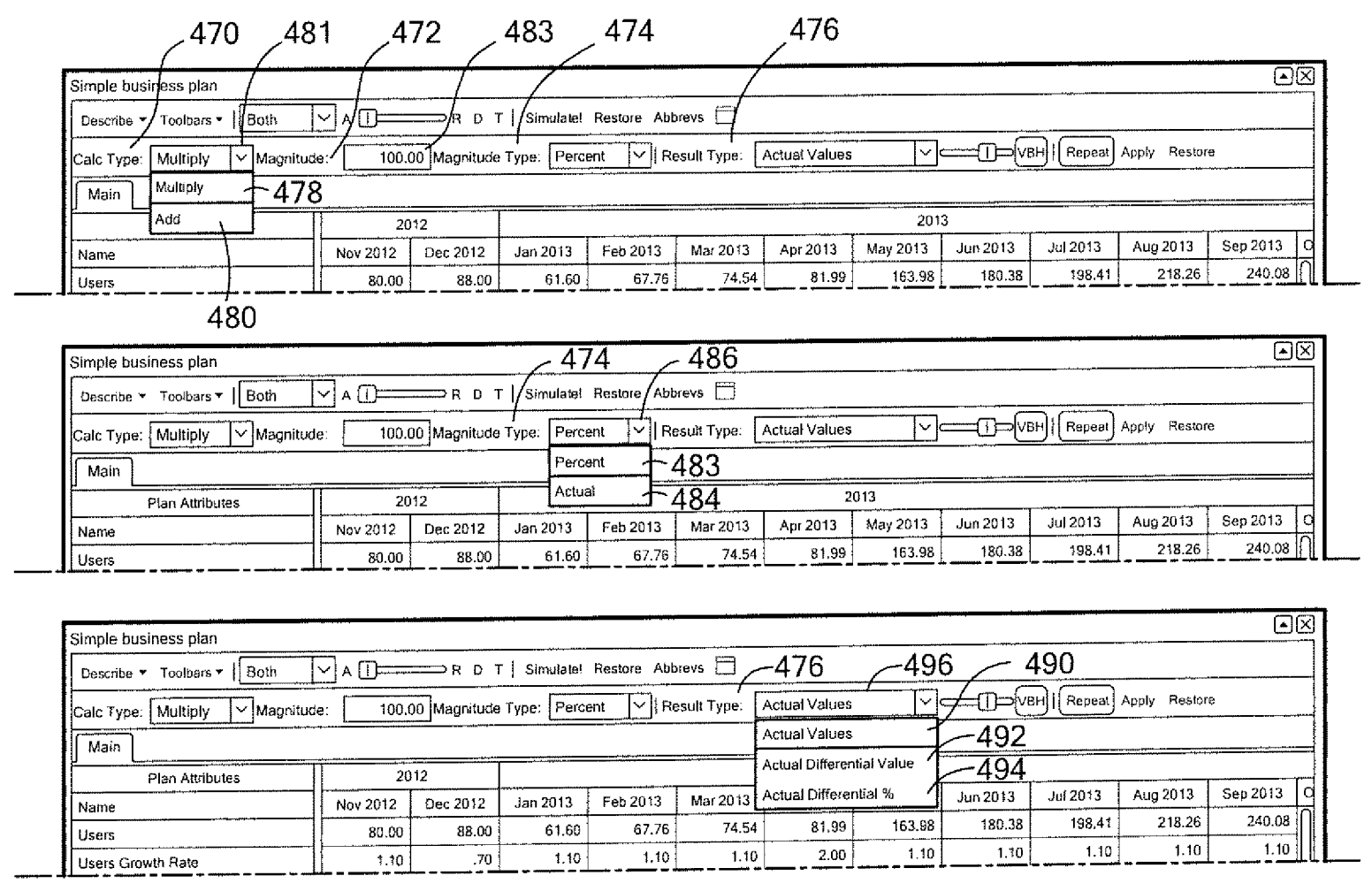

Calculation type 470 may include Multiply 478, FIG. 22, or Add 480 chosen from drop-down box 481. Magnitude 472 is preferably a non-zero numeric value entered into input box 483, e.g., in this example, 100.00. Magnitude type 474 may include Percent 483 or Actual 484 selected from drop-down box 486. Result type 476 may be chosen to be Actual Values 490, Actual Differential Value 492, or Actual Differential Percent 494 chosen from drop-down box 496.

Sensitivity analyzer 456, FIG. 19, is preferably configured to determine a differential between an original numeric value of each dependent cell affected by the change to the start cell and the original numeric value of each dependent cell. Sensitivity analyzer 456 is further configured to highlight affected dependent cells in a highlighted gradient showing a proportion to the degree of differentiality, as will be discussed in further detail below.

Figure 24:
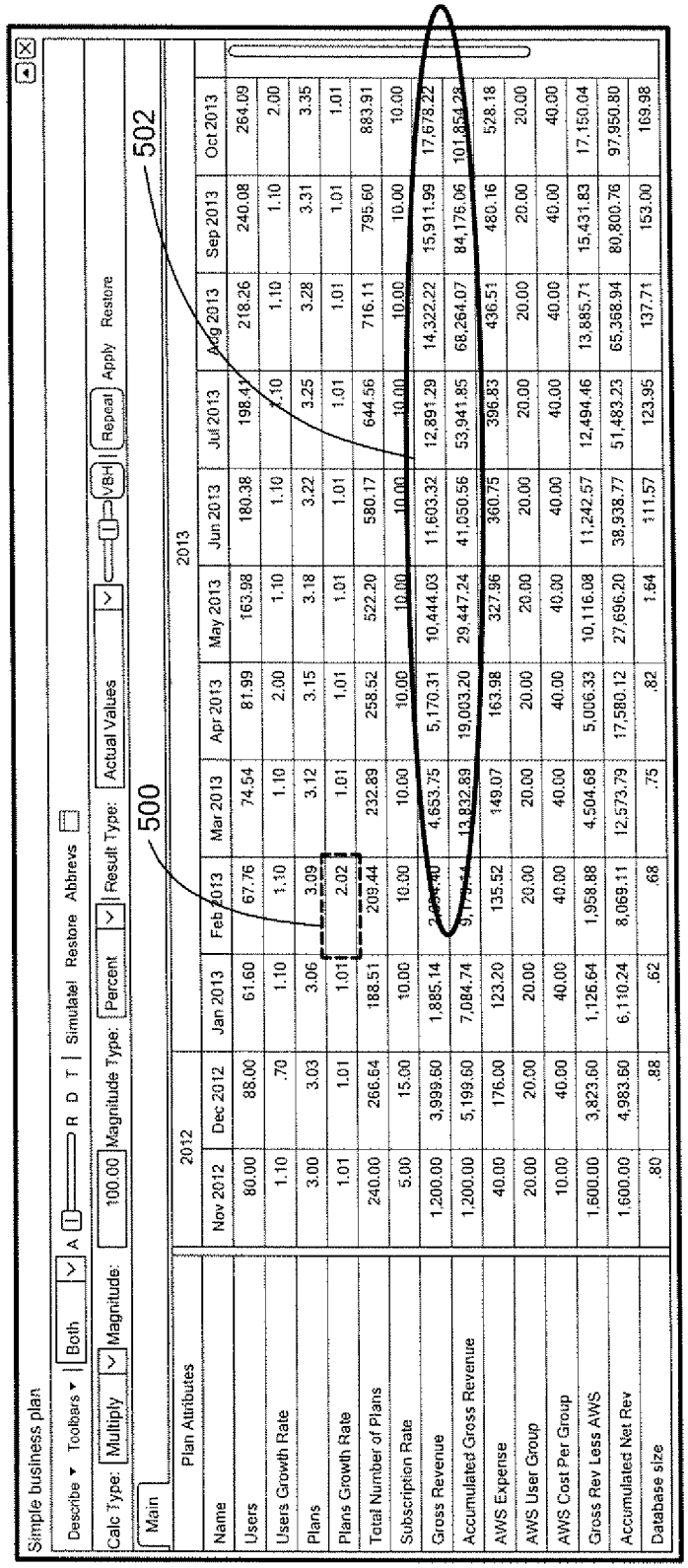
FIG. 24 is a view showing an example of a user-initiated manual change to the start cell shown in FIG. 23 and the corresponding change in values of dependent cells which are difficult to read.

For example, FIG. 23 shows a view of an example of plan 14" wherein a user has selected start cell 500. FIG. 24 shows an example of a user-initiated manual change to start cell 500, e.g., 1.01 has been manually changed to 2.02. As exemplarily indicated at 502, some of the affected dependent or terminal cells are difficult to see compared to the original values shown in FIG. 23 and it would be easy for many cell-value changes to go unnoticed by the user.

Figure 25:
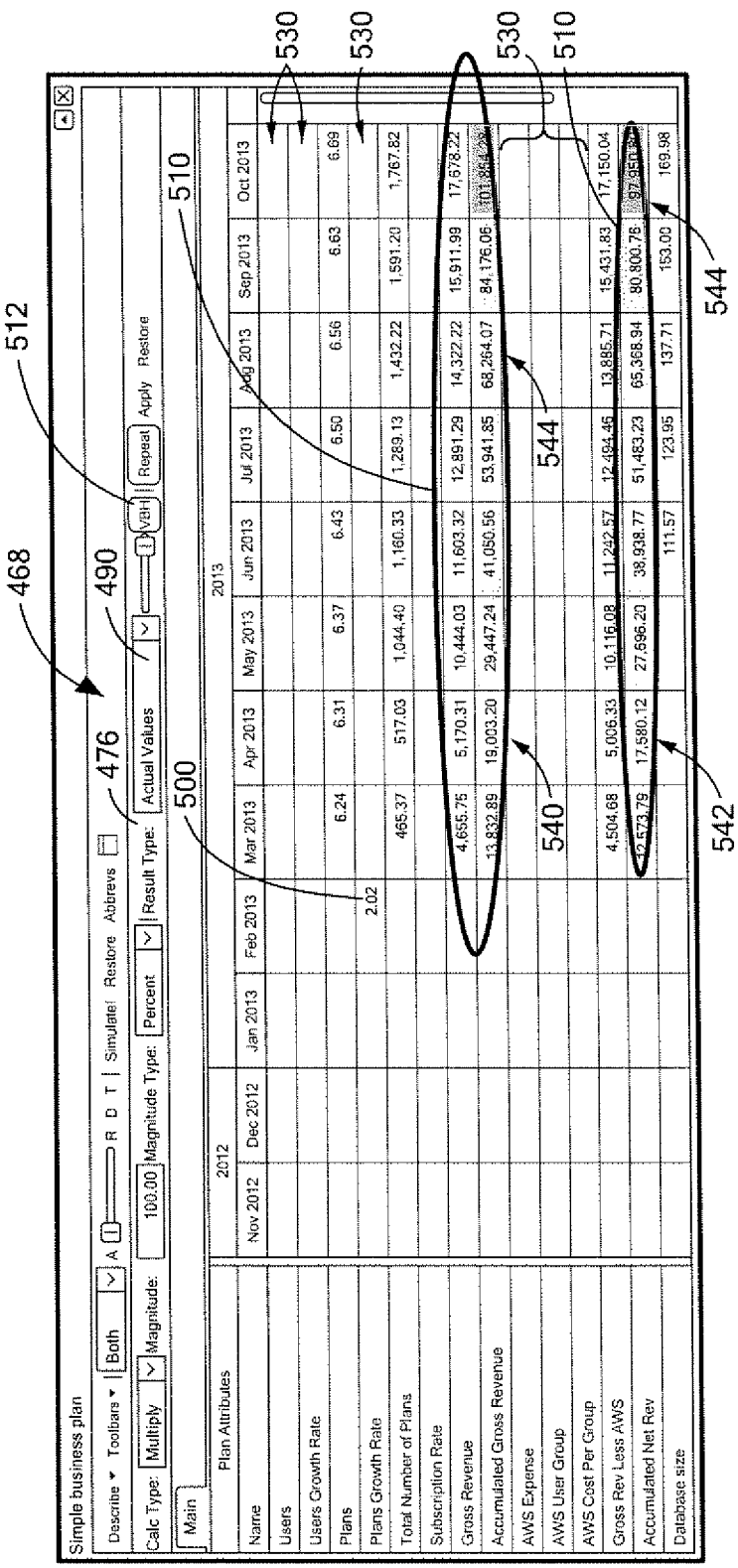
FIG. 25 is a view showing one example of the sensitivity analyzer shown in FIG. 19 automatically changing the value of a start or root cell using the configurable user-initiated change combination provided by the sensitivity tool bar and the resulting dependent cells affected by the change in a predetermined sensitivity format which is easy to detect.
Figure 27:
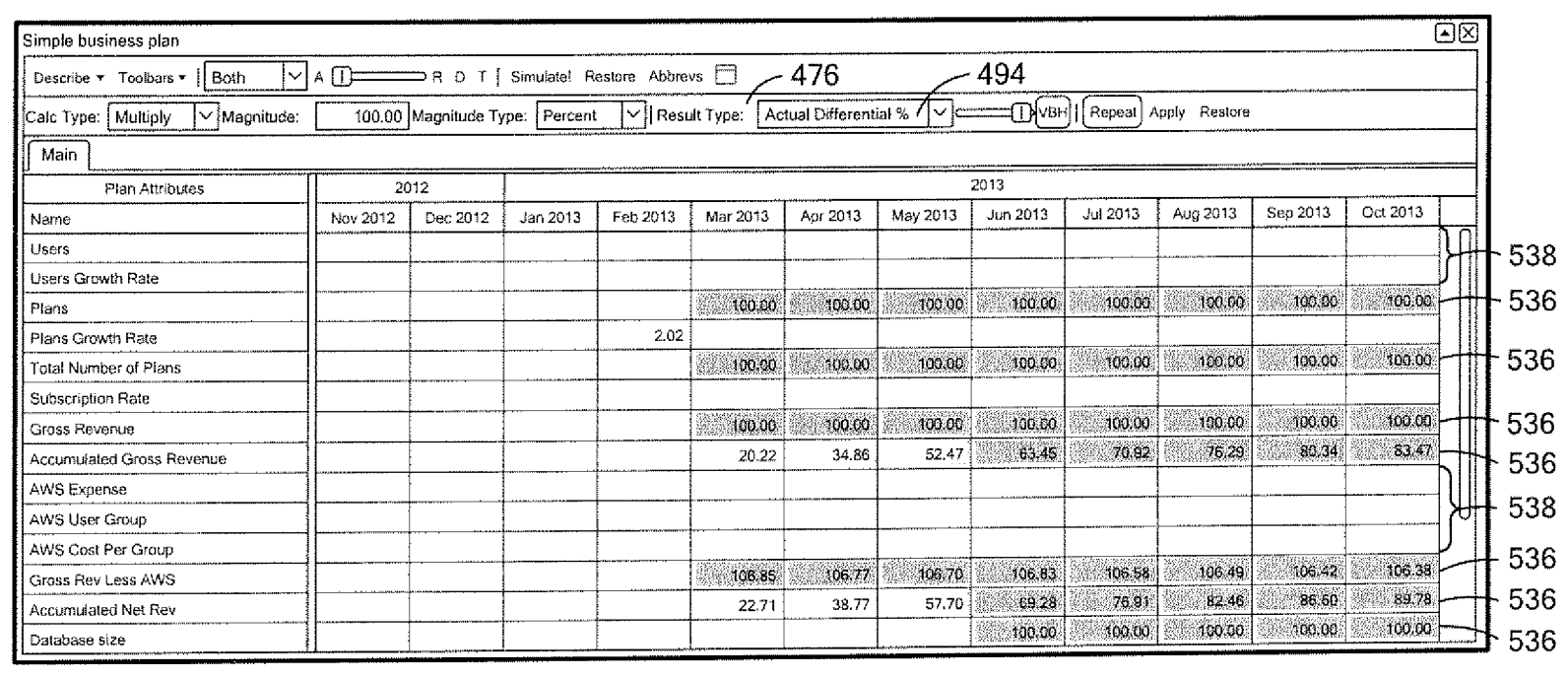

In contrast, as shown in FIG. 25, sensitivity analyzer 456 of system 450, FIG. 19, of one or more embodiments of this invention, automatically changes the value of start cell 500 using the configurable user-initiated change combination provided by sensitivity mode toolbar 468, as shown, and visually highlights the dependent cells affected by the change in a predetermined sensitivity format, e.g., unique gradient, shown by the shading indicated at 510. In this example, value based highlighting is performed by selecting VBH button 512. The lighter and darker shading of gradient 540, indicated at 542, 544, respectively shows the proportion of the degree of differentiality. Sensitivity analyzer 456, FIG. 19 is also preferably configured to hide cells that are unaffected by the change to start cell 500, e.g., as indicated at 530. In this example, the Result Type 476, to be visually highlighted by sensitivity analyzer 456 is for Actual Values 490. In another example, Result Type 476 may be for actual differential values 492 as shown in FIG. 26 where the visually highlighted gradient showing the proportion of the degree of differentiality as indicated by the shading at shown at 552 and the unaffected cells are indicated at 554. Similarly, FIG. 27 shows an example of result type 476 expressed in actual differential %-494 where the predetermined sensitivity format is a visually highlighted gradient showing the proportion of the degree of differentiality indicated at 536 and the cells unaffected by the change to the start cell are hidden as indicated at 538.

Figure 28:
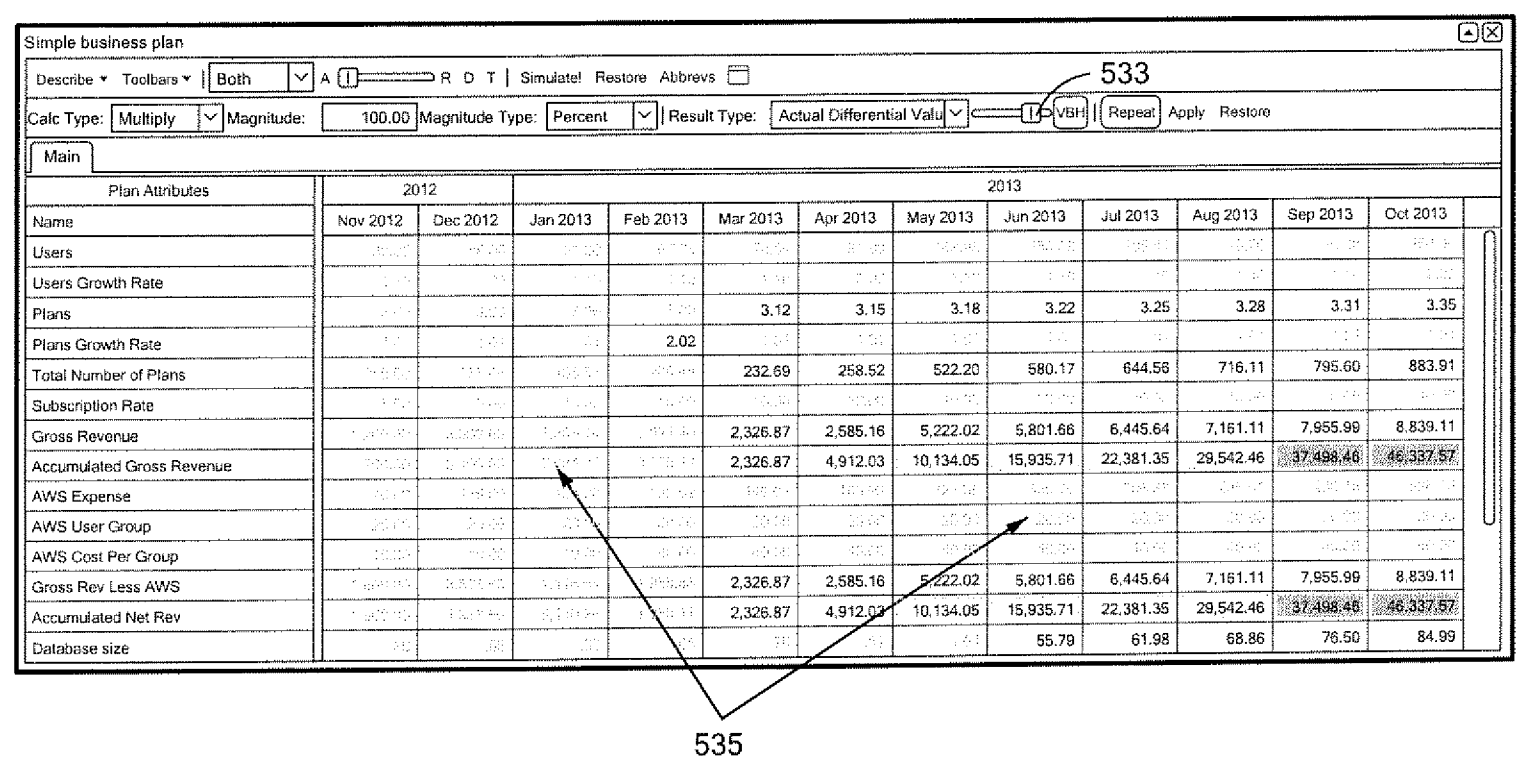

FIG. 28 shows an example of view generated by sensitivity analyzer 456 of system 450 where previously hidden cells not affected by a user-initiated change to a start cell can be revealed by moving slider 533 towards the left. The cells are preferably revealed in grey scale, as indicated at 535. FIG. 29 shows a view generated by system 450 of restoring start cell 500 to its original value of 1.01 using restore button 590. All cells are restored to their original state as indicated at 592.

In one embodiment, sensitivity analyzer identifies a set of cells that are computational ancestors of the starting cell, step 580, FIG. 19. The user-specified calculation, type, and magnitude are applied to the starting cell, step 582. Computational ancestors are evaluated and their root cell values are determined and buffered, step 584. Based on the output type, new values are displayed, either in comparison to old values or in nominal terms, step 586.

Based on the result display options, new values are highlighted in a variety of predetermined sensitivity formats including gradient based highlighting with an amount of highlighting applied being in proportion to the change in value from the old value, step 588.

Figure 30:
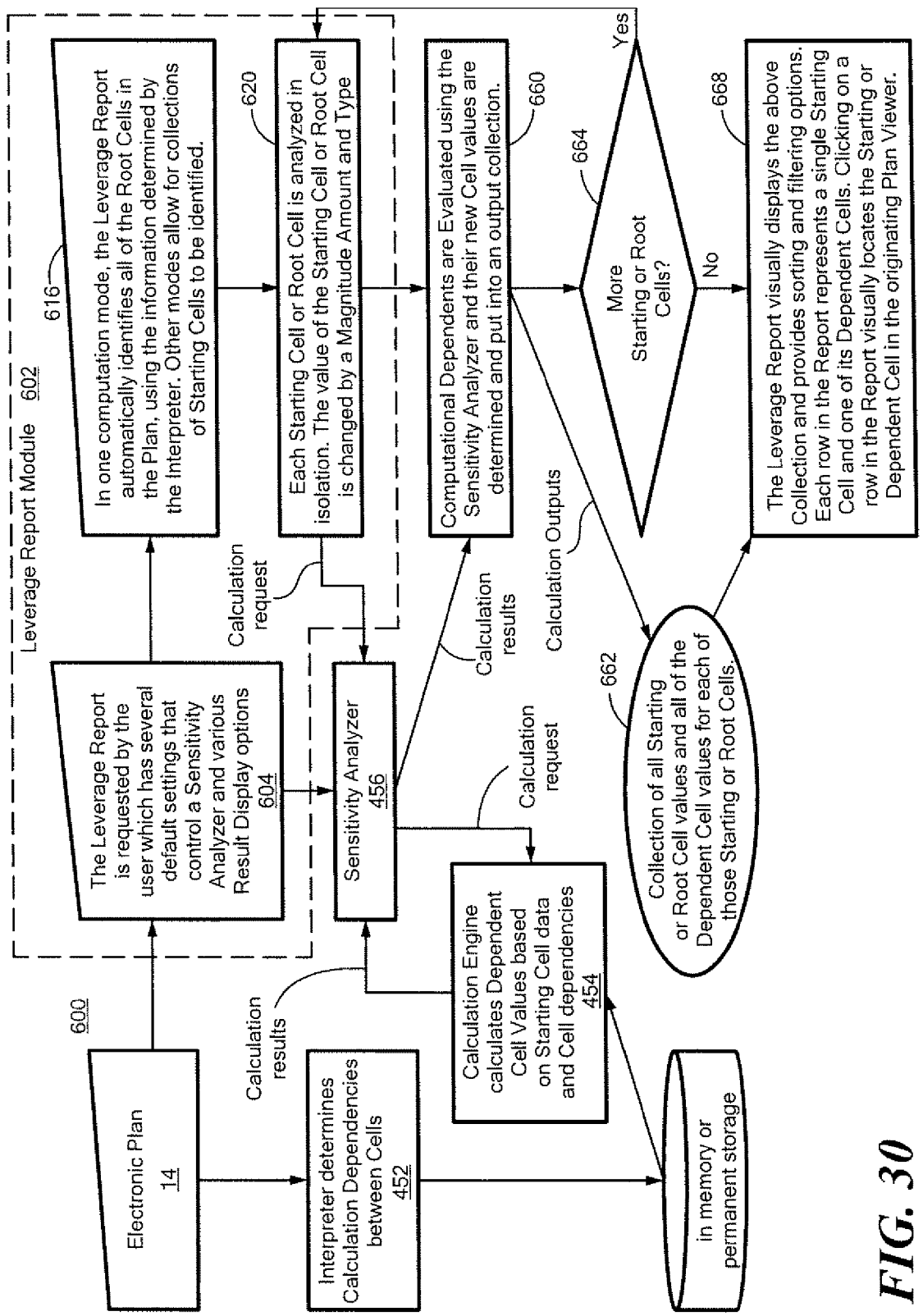
FIG. 30 is a schematic block-diagram showing the primary components of another embodiment of the integrated, configurable, sensitivity, analytical, temporal, visual electronic plan system of this invention which may be used to generate a leverage report.

Integrated, configurable, sensitivity, analytical, temporal, visual system 600, FIG. 30, where like parts have been given like numbers, for an electronic plan of one embodiment of this invention includes an electronic plan, e.g., electronic plan 14', FIG. 31, having similar structure to electronic plans 14, 14', 14" discussed above with reference to one or more of FIGS. 1A-29. System 600, FIG. 30, includes leverage report module 602 configured to set a user configurable default change in magnitude 472, FIGS. 21 and 22 and magnitude type 474 to be applied to a collection of starting cells or all roots cells of plan 14''', step 604, FIG. 30. In one example, the default change in magnitude is 10 and the type is percent, indicated at 606, FIG. 32. In other examples, magnitude type 474, FIG. 22, may be actual 484, as discussed above and the magnitude may be any non-zero numeric value entered into input box 483.

Leverage report module 604, FIG. 30, in combination with interpreter 452, is configured to identify all root cells in plan 14', FIG. 31, e.g., root cells 608, 610, 612, and 614, step 616, FIG. 30. In another example, leverage report module 604 is configured to identify a collection of starting cells of plan 14''' in response to a user selecting one or more cells of plan 14', e.g., the user clicks on any of the cells of plan 14'. In this example, for simplicity, the collection of starting cells are the same as the root cells, but they may be any of the cells in plan 14'''.

Sensitivity analyzer 456, FIG. 30, in response to request 620 is configured to calculate a new value for each of root cells 608-614, FIG. 31, or the user specified collection of starting cells, using the default change in magnitude and magnitude type, in this example 10%, as discussed above.

Sensitivity analyzer 456, FIG. 30, is further configured to loop through all of root cells 608-614, FIG. 31 of plan 14", or all starting cells of plan 14''' and in combination with calculation engine 454 and interpreter 452, calculates a new value for all cells depending on root cells 608-614, or the user specified starting cells, using the default magnitude and magnitude type, e.g., 10% as indicated at 606, FIG. 32, to generate leverage result 636, FIG. 32, in predetermined sensitivity format 638, steps 660, 662, 664, 668, FIG. 30. In this example, all cells depending on root cells 608-612, FIGS. 31 and 32, are indicated at 640, FIG. 32, the original values of the dependent cells is indicated at 642, and the new calculated value is indicated at 644. The value change is indicated at 646, the % change is indicated at 648, and the leveraged amount is indicated at 636. In this example, predetermined sensitivity format 638 is preferably gradient highlighting, e.g., as discussed above with reference to one or more of FIGS. 1A-27.

As can been seen, leverage report 622 includes a collection of all root cells, or a collection of starting cells, all cells which dependent from the root cells or the collection of staring cells, the original and new values computed using the default change in magnitude and magnitude type and a unique lavage result which allows the user to determine the impact of the default change in magnitude and magnitude type.

The result is integrated, configurable, sensitivity, analytical, temporal, visual electronic plan system 450, 600, FIGS. 19-32, of one or more embodiments of the invention combines input manipulation, output transformation and normalization, shading, or color-coding and results isolation. Sensitivity analysis may be run on the entire plan in seconds, yielding a report that draws focus to the most computationally interesting aspects of the plan and provides formulae that are expressed in generalized natural language terms. Such information is invaluable to a financial modeler who needs to understand the workings of the plan. The sensitivity analyzer allows the user to configure the parameters of a variety of sensitivity analysis types and then automatically applies those parameters to a point in the model. Both the inputs and outputs to the analysis are transformed based on the user's configuration settings, all within the original data locations within the plan. Thus, context within the overall model is maintained for better clarity. No copies of the original data are required, and portions of the model that are not affected by the analysis can be visually hidden so that the affected portions stand out. When the user has finished using the sensitivity analyzer, the user can easily return the plan to original state. The innovative leverage report module and sensitivity analyzer provides a leverage report which shows the impact of a change in magnitude and magnitude type to all root cells or a collection of starting cells of the plan to provide for easy financial modeling.

Although as discussed above with reference to one or more of FIGS. 19-29, visually highlighting of dependent cells affected by the change to a root cell in a predetermined sensitivity format is shown as shading or coloring, this is not a necessary limitation of this invention. In other examples, the predetermined sensitivity format may include bolding, changing to font, and the like.

For enablement purposes only, the following code portions are provided which can be executed on one or more processor, a computing device, or computer to carry out the primary steps and/or functions of system 10, system 450 and system 600 and the methods thereof discussed above with reference to one or more of FIGS. 1A-32 and recited in the claims hereof. Other equivalent algorithms and code can be designed by a software engineer and/or programmer skilled in the art using the information provided herein.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. An integrated, configurable, sensitivity, analytical, temporal, visual system for an electronic plan system comprising:
   a computer readable storage device having computer readable program code embodied therewith, the computer readable program code comprising computer readable program code configured to generate:
   an electronic plan including:
      one or more row descriptors each including a plurality of row descriptor properties,
      one or more column descriptors each including a plurality of column descriptor properties,
      one or more cells mapped to one of the row descriptors by a unique row descriptor identifier and to one of the column descriptors by a unique column descriptor identifier, and
      each of the one or more cells including a numeric formula or a user-defined formula that references one or more other cells;
   an interpreter configured to read each formula of the one or more cells and determine dependency data associated with each cell;
   a calculation engine responsive to the interpreter configured to determine a numeric value of each of the one or more cells;
   a sensitivity analyzer responsive to a configurable user-initiated change to a value of a start cell configured to activate the calculation engine to calculate the value of dependent cells affected by said change and visually highlight the dependent cells affected by the change in a predetermined sensitivity format;
   the storage device configured to store all data associated with the plan; and
   the sensitivity analyzer further configured to determine a differential between an original numeric value of each dependent cell affected by said change and the newly computed value of each said dependent cell and highlight the affected dependent cells, wherein the highlight is configured to correlate with the degree of change of the value of said affected dependent cells relative to the original value of the dependent cells.

2. The system of claim 1 in which the predetermined sensitivity format includes user defined hiding of cells not affected by the change of the value to the start cell.

3. The system of claim 1 further including a sensitivity analyzer input module for inputting the configurable user-initiated change to the value of the start cell.

4. The system of claim 3 in which the configurable user-initiated change to the value of a start cell includes a user-specified combination of a calculation type, a magnitude, and a magnitude type.

5. The system of claim 4 in which the sensitivity engine, in combination with said calculation engine, is configured to change the value of all dependent cells of the plan based on the user specified combination.

6. The system of claim 4 in which the calculation type includes multiply or add.

7. The system of claim 4 in which the magnitude has a non-zero numeric value.

8. The system of claim 4 in which the magnitude type includes percent or actual.

9. The system of claim 4 in which the combination includes a result type for displaying the visually highlighted dependent cells affected by said change.

10. The system of claim 9 in which the result type includes actual values, actual differential values or actual differential percent.

11. The system of claim 1 in which the sensitivity analyzer is configured to highlight affected dependent cells in a highlighted gradient showing a proportion to the degree of differentiality.

12. The system of claim 1 in which the differential is expressed by one or more of percentage values, actual values, or actual differential values.

13. The system of claim 4 further including a leverage report request module configured to set a user configurable default change in magnitude value and magnitude type to be applied to a user-specified collection of starting cells or root cells of the electronic plan.

14. The system of claim 13 in which the leverage report module is configured to identify the user-specified collection of starting cells in the plan or all root cells in the plan.

15. The system of claim 14 in which sensitivity analyzer, in response to the leverage report module, is configured to calculate a new value for each of the collection of starting cells using the default change in magnitude and magnitude type.

16. The system of claim 14 in which the sensitivity analyzer, in response to the leverage report module, is configured to calculate a new value for each of the root cells using the default change in magnitude and magnitude type.

17. The system of claim 15 in which the sensitivity analyzer, in combination with the calculation engine and the interpreter, is configured to loop through all starting cells of the plan and calculate a new value for all cells depending on each starting cell using the default change in magnitude and magnitude type to generate a leverage result in a predetermined sensitivity format.

18. The system of claim 17 in which the sensitivity analyzer is configured to generate a leverage report including the collection of starting cells and all their dependent cells and the leverage result in the predetermined sensitivity format.

19. The system of claim 16 in which the sensitivity analyzer, in combination with the calculation engine and the interpreter, is configured to loop through all root cells of the plan and calculate a new value for all cells depending on each root cell using the default change in magnitude and magnitude type to generate a leverage result in a predetermined sensitivity format.

20. The system of claim 19 in which the sensitivity analyzer is configured to generate a leverage report including the collection of root cells and all their dependent cells and the leverage result in the predetermined sensitivity format.

21. A computer program product having program code stored on a non-transitory computer-readable medium, which when executed by at least one computing device, causes at least one computing device to generate:
an electronic plan including:
one or more row descriptors each including a plurality of row descriptor properties,
one or more column descriptors each including a plurality of column descriptor properties,
one or more cells mapped to one of the row descriptors by a unique row descriptor identifier and to one of the column descriptors by a unique column descriptor identifier,
each of the one or more cells including a numeric formula or a user-defined formula that references one or more other cells;
an interpreter configured to read each formula of the one or more cells and determine dependency data associated with each cell;
a calculating engine responsive to the interpreter configured to determine a numeric value of each of the one or more cells;
a sensitivity analyzer responsive to a configurable user-initiated change to a value of a start cell configured to activate the calculation engine to calculate the value of dependent cells affected by said change and visually highlight the dependent cells affected by the change in a predetermined sensitivity format; and
the sensitivity analyzer further configured to determine a differential between an original numeric value of each dependent cell affected by said change and the newly computed value of each said dependent cell and highlight the affected dependent cells, wherein the highlight is configured to correlate with the degree of change of the value of said affected dependent cells relative to the original value of the dependent cells.

22. A method executing on a computing device for generating an integrated, configurable, sensitivity, analytical, temporal, visual system for an electronic plan comprising:
assigning one or more row descriptors each including a plurality of row descriptor properties to one or more rows of an electronic plan;
assigning one or more column descriptors each including a plurality of column descriptor properties to one or more columns of the electronic plan;
mapping one or more cells to one or more row descriptors by a unique row descriptor identifier and to one of the column descriptors by a unique column descriptor identifier, each of the one or more cells including a numeric formula or a user-defined formula that references one or more other cells;
reading each formula of the one or more cells and determining dependency data associated with each cell;
determining a numeric value for each of the one or more cells; and
in response to a configurable, user-initiated change to the value of a start cell, calculating the value of all dependent cells affected by said change and visually highlighting the dependent cells affected by the change in a predetermined sensitivity format; and
determining a differential between an original numeric value of each dependent cell affected by said change and the newly computed value of each said dependent cell and highlighting the affected dependent cells, wherein the highlight correlates with the degree of change of the value of said affected dependent cells relative to the original value of the dependent cells.

23. The method of claim 22 further including setting a user configurable default change in magnitude value and magnitude type to be applied to a collection of starting cells or root cells of the electronic plan.

24. The method of claim 23 further including identifying a user-specified collection of starting cells in the plan or all root cells in the plan.

25. The method of claim 24 further including calculating a new value for each of the starting cells or the root cells using the default change in magnitude and magnitude type.

26. The method of claim 25 further including looping through all starting cells of the plan or all root cells of the plan and calculating a new value for each of the starting cells or the root cells and a new value for all cells depending on each starting cell or root cell using the default change in magnitude and magnitude type to generate a leveraged result in a predetermined sensitivity format.

* * * * *